US011091957B2

(12) United States Patent
Voss et al.

(10) Patent No.: US 11,091,957 B2
(45) Date of Patent: Aug. 17, 2021

(54) MODULAR LADDER SYSTEM

(71) Applicant: SAYFA R&D PTY LTD, Boronia (AU)

(72) Inventors: Barry Voss, Boronia (AU); Murray Voss, Boronia (AU)

(73) Assignee: SAYFA R&D PTY LTD, Boronia (AU)

(*) Notice: Subject to any disclaimer, the term of this patent is extended or adjusted under 35 U.S.C. 154(b) by 36 days.

(21) Appl. No.: 16/328,260

(22) PCT Filed: Jul. 24, 2018

(86) PCT No.: PCT/AU2018/050768
§ 371 (c)(1),
(2) Date: Feb. 25, 2019

(87) PCT Pub. No.: WO2019/018888
PCT Pub. Date: Jan. 31, 2019

(65) Prior Publication Data
US 2019/0338589 A1 Nov. 7, 2019

(30) Foreign Application Priority Data
Jul. 24, 2017 (AU) ................. 2017902898

(51) Int. Cl.
E06C 1/10 (2006.01)
E06C 7/08 (2006.01)
(Continued)

(52) U.S. Cl.
CPC ............. E06C 1/10 (2013.01); E06C 7/08 (2013.01); E06C 7/185 (2013.01); E06C 7/187 (2013.01);
(Continued)

(58) Field of Classification Search
CPC ... E06C 1/10; E06C 7/08; E06C 7/185; E06C 7/187
See application file for complete search history.

(56) References Cited

U.S. PATENT DOCUMENTS 3,762,500 A * 10/1973 Sarno .................. E06C 7/48
182/93
3,885,647 A * 5/1975 Acosta .................. E06C 7/187
182/8
(Continued)

FOREIGN PATENT DOCUMENTS

DE 2626425 A1 12/1977
EP 1253280 A2 10/2002
(Continued)

OTHER PUBLICATIONS

International Search Report & Written Opinion dated Sep. 3, 2018 from PCT Application No. PCT/AU2018/050768.
(Continued)

Primary Examiner — Alvin C Chin-Shue
(74) Attorney, Agent, or Firm — Innovation Capital Law Group, LLP; Vic Lin

(57) ABSTRACT

A modular ladder system has a rung section having two elongate lateral stile extrusions and elongate rung extrusions spanning therebetween. Each stile extrusion may define an attachment side having an attachment face which has two attachment channels which are adjacent, parallel and longitudinally arranged along the attachment face. Each attachment channel may have inward facing rails which define an elongate insertion space therebetween and a relatively wider connector head accommodation void thereunderneath. Furthermore, each rail may define a connector head engaging under edge. Each stile extrusion may further define a connection side adjacent to the attachment side which may define a splice joint extrusion accommodating void therein. In this way, the present modular ladder system may be quickly and easily constructed and various accessories quickly and easily attached thereto.

23 Claims, 35 Drawing Sheets

(51) Int. Cl.
  *E06C 7/18* (2006.01)
  *E06C 7/50* (2006.01)
  *E06C 9/02* (2006.01)
  *F16B 5/02* (2006.01)

(52) U.S. Cl.
  CPC ............... *E06C 7/50* (2013.01); *E06C 9/02* (2013.01); *F16B 5/02* (2013.01); *E06C 7/081* (2013.01)

(56) References Cited

U.S. PATENT DOCUMENTS

| | | | | |
|---|---|---|---|---|
| 3,970,400 | A * | 7/1976 | Reid | B21D 39/00 403/242 |
| 4,352,409 | A * | 10/1982 | Fountain | E06C 7/187 182/8 |
| 4,524,848 | A * | 6/1985 | Russo | E06C 5/04 182/106 |
| 4,802,643 | A | 2/1989 | Uys | |
| 4,823,912 | A | 4/1989 | Gould et al. | |
| 4,917,216 | A | 4/1990 | Kimber | |
| 5,238,084 | A | 8/1993 | Swager | |
| 5,265,696 | A | 11/1993 | Casebolt | |
| 5,560,731 | A * | 10/1996 | Kronenberg | E06B 3/667 403/298 |
| 6,161,647 | A | 12/2000 | Braden et al. | |
| 6,324,988 | B1 * | 12/2001 | Svensson | B08B 15/002 104/89 |
| 6,408,587 | B2 * | 6/2002 | Cronin | E04C 3/04 52/637 |
| 6,789,647 | B1 | 9/2004 | Yeh | |
| 6,837,337 | B2 | 1/2005 | Thomas et al. | |
| 6,929,094 | B1 * | 8/2005 | Kohlmeier | E06C 7/185 182/106 |
| 7,137,478 | B2 * | 11/2006 | Becker | E04G 5/10 182/106 |
| 8,152,115 | B2 * | 4/2012 | Blichmann | C12C 13/10 211/193 |
| 8,205,717 | B2 * | 6/2012 | Sutton | B60R 9/00 182/127 |
| 9,797,186 | B2 * | 10/2017 | Kronenberg | E06B 3/667 |
| 10,236,821 | B1 * | 3/2019 | Atia | |
| 2005/0189172 | A1 | 9/2005 | Becker | |
| 2010/0133040 | A1 | 6/2010 | London | |
| 2011/0011679 | A1 | 1/2011 | Leng | |
| 2012/0247869 | A1 * | 10/2012 | Anderson | E06C 7/187 182/8 |
| 2014/0000191 | A1 * | 1/2014 | Snyker | E06B 3/66 52/204.593 |
| 2015/0090531 | A1 * | 4/2015 | Yang | E06C 1/18 182/104 |

FOREIGN PATENT DOCUMENTS

| | | | |
|---|---|---|---|
| EP | 2248989 | A1 | 11/2010 |
| FR | 2437846 | A1 | 4/1980 |
| FR | 2606649 | A1 | 5/1988 |
| FR | 2617650 | A1 | 1/1989 |
| GB | 1092856 | A | 11/1967 |
| GB | 1452204 | A | 10/1976 |
| JP | 2007270452 | A * | 10/2007 |
| NL | 2017371 | B1 | 3/2018 |
| WO | 0238222 | A1 | 5/2002 |
| WO | 2017070314 | A1 | 4/2017 |
| WO | 2017122035 | A1 | 7/2017 |
| WO | 2019018888 | A1 | 1/2019 |

OTHER PUBLICATIONS

UK Search Report dated Nov. 28, 2019 from Application No. GB1908493.8.
https://industrialsafety.honeywell.com/en-us/products/by-category/fall-protection/fall-protection-kits/miller-vi-go-ladder-climbing-safety-systems-cable.
https://www.3m.com/3M/en_US/company-us/all-3m-products/?N=5002385+8709322+8711017+8711405+8720539+8720544+873508 5+8737761+3294857497&rt=r3.
https://www.avanti-online.com/products/fps.
https://www.capitalsafety.com/aunzadmin/pages/Product-Category-Overview-Page.aspx?prodCatId=6.
https://www.skylotec.com/eu_en/permanent-systems/products/vertical-fall-arrest-systems/.

* cited by examiner

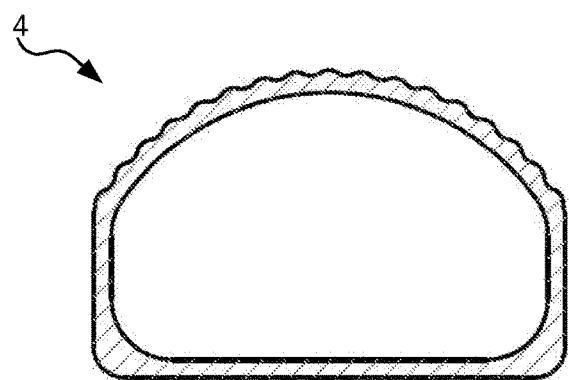
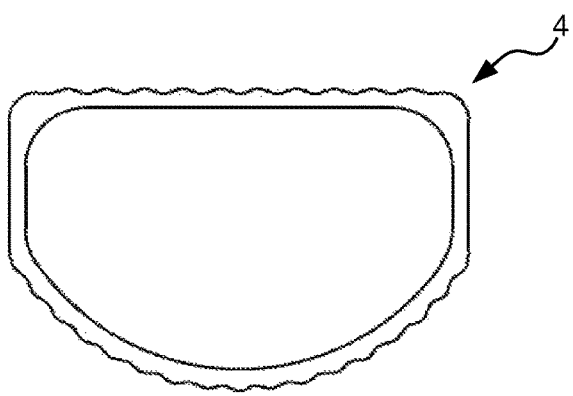
Fig. 22A   Fig. 22B
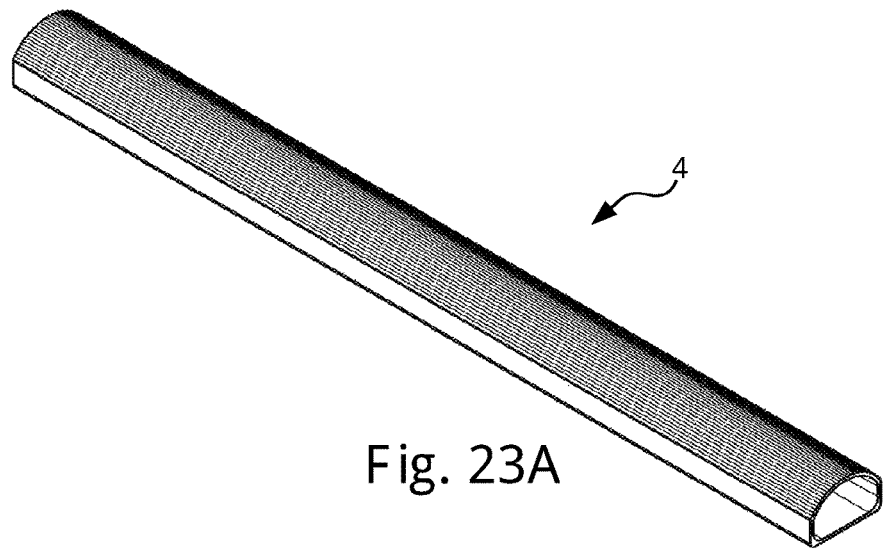
Fig. 23A
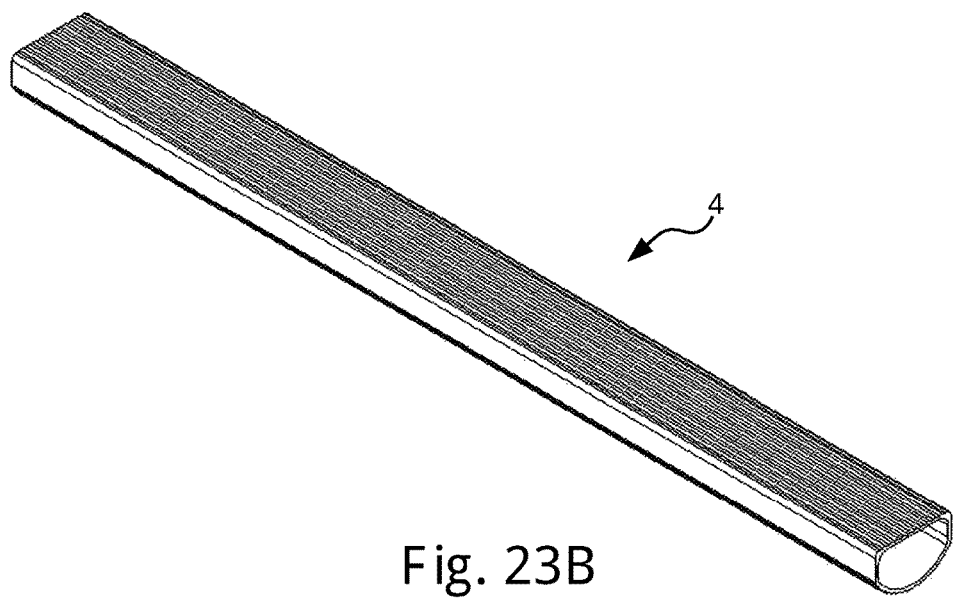
Fig. 23B

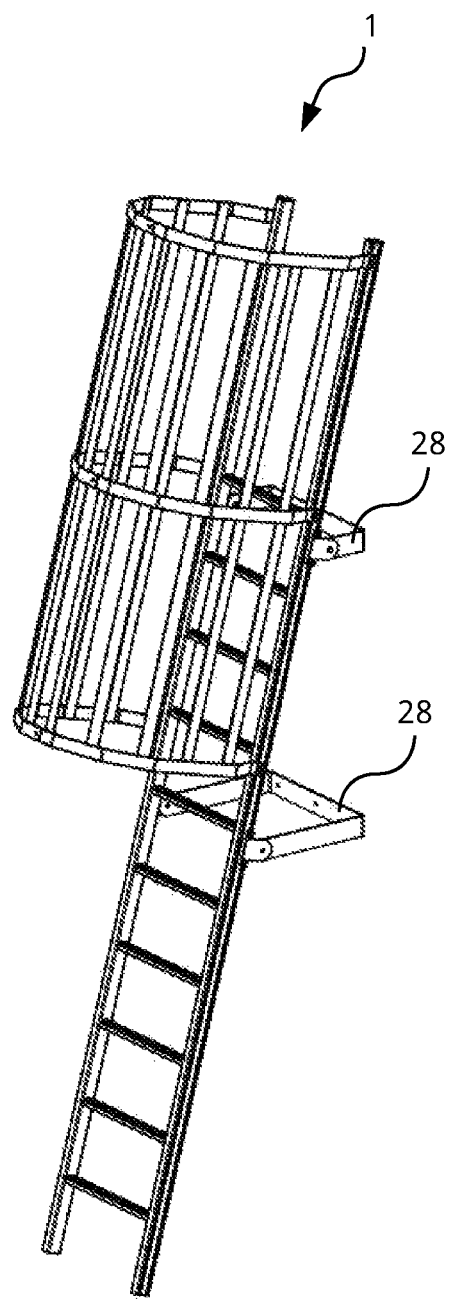
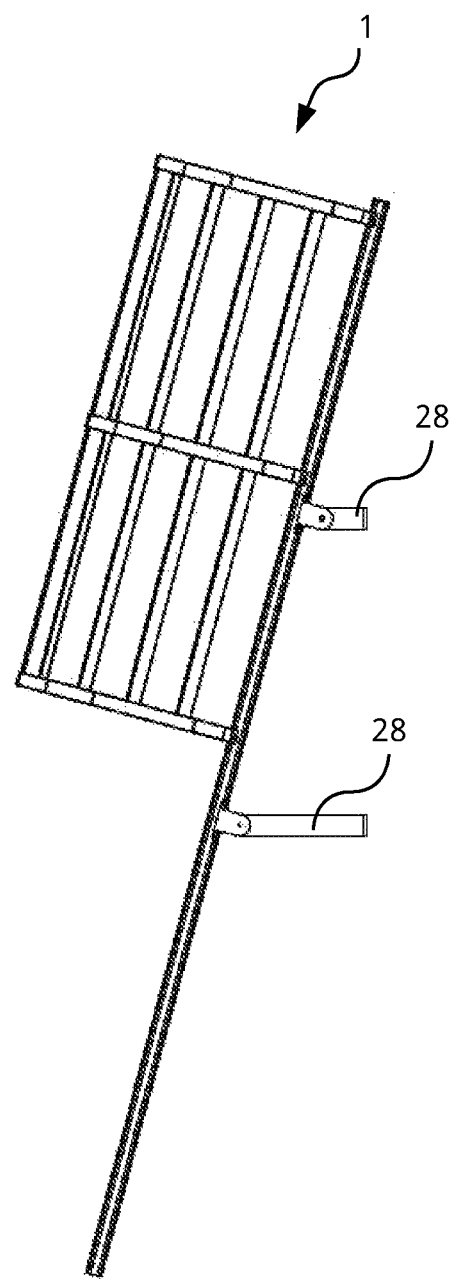
Fig. 34A
Fig. 34B

MODULAR LADDER SYSTEM

FIELD OF THE INVENTION

This invention relates generally to a modular ladder system and methods of erection thereof.

BACKGROUND OF THE INVENTION

Modular ladder componentry is desirous for configurable construction of ladders suited for differing applications.

For example, US 2011/0011679 A1 (LENG) 20 Jan. 2011 [hereinafter referred to as D1] discloses a ladder which comprises two stiles and at least a step unit mounted between the two stiles. The step unit includes a hollow step, an inner sleeve and an outer sleeve. The inner sleeve is fit into the hollow step, at an end of which a position restriction portion is located to prevent the inner sleeve from moving out, and the outer sleeve is adapted to surround the end of the hollow step. The arrangement of D1 is for having high supporting strength and a high shear resistance.

GB 1092856 A (ALLOY ENGINEERING AND LADDER COMPANY LIMITED) 29 Nov. 1967 [hereinafter referred to as D2] relates to joints for the connection of metal sections which teaches a metal section, forming a stile of a builder's and painter's trestle, which has a portion of channel cross-section forming a spine 5 and lateral channels with return members the edges of which are spaced to provide a gap aligned with the spine and which have opposed indentations forming apertures. The ends of channel-section metal cross members are received in the apertures and pass into the spine to which they are bolted or riveted.

U.S. Pat. No. 4,802,643 A (UYS) 7 Feb. 1989 [hereinafter referred to as D3] discloses a GRP cable ladder rack so-called as being a structure resembling ladders which are used to support cables of which the longitudinal rails have a cross-sectional shape which is S-formed, the cross rungs of the ladder being glued and dowelled in the lower channel of the S-form. A short length of rail can be used to splice ladders to each other end to end using pop rivets and epoxy glue.

US 2005/0189172 A1 (BECKER) 1 Sep. 2005 [hereinafter referred to as D4] discloses a safety ladder cage system which is of a fabricated construction to reduce the time and expertise to provide a safety cage to one side of a scaffold system access ladder. The safety cage system is divided into two components each of which can be carried by a worker to the appropriate point and loosely hung from a ladder rung or the ladder uprights. The worker is then free to accurately position the safety cage component to one side of the ladder. The second component is then brought into position and attached to the opposite side of the ladder in a similar manner. The components are then attached to each other along vertical securing edges outwardly spaced from and generally centered on the ladder. Each component preferably includes its own captured connector for engaging the opposite component.

U.S. Pat. No. 4,823,912 A (GOULD et al.) 25 Apr. 1989 [hereinafter referred to as D5] discloses a multipurpose, two-position ladder attachment for extending a ladder above overhanging roofs while bridging the eaves and gutters, for leaning against weak sidings, and for installing heavy or bulky panels or windows in elevated openings. Elongated channels formed in two cantilevered brackets are clamped about the stiles of the ladder by a rod and wing nuts. The rod passes through hollow rungs of the ladder or in close proximity to the stiles if the rungs are not hollow. A flat padded board connected across the free ends of the brackets is positionable with its broad side horizontal or vertical when the ladder is leaned at a recommended angle.

The present invention seeks to provide a modular ladder system, which will overcome or substantially ameliorate at least some of the deficiencies of the prior art, or at least to provide an alternative.

It is to be understood that, if any prior art information is referred to herein, such reference does not constitute an admission that the information forms part of the common general knowledge in the art, in any country.

SUMMARY OF THE DISCLOSURE

There is provided herein a modular ladder system comprising a rung section comprising two elongate lateral stile extrusions and elongate rung extrusions spanning orthogonally between the lateral stile extrusions.

Each stile extrusion defines an attachment side having an attachment face. The attachment face has two attachment channels which are adjacent, parallel and longitudinally arranged along the attachment face.

Each attachment channel has inward facing rails which define an elongate insertion space therebetween and a relatively wider connector head accommodation void thereunderneath. Furthermore, each rail defines a connector head engaging under edge.

Each stile extrusion further defines a connection side adjacent the attachment side. The connection side defines a splice joint extrusion accommodating void therein.

Each rung section may be arranged such that the connection sides are oppositely and laterally facing.

In this way, the present modular ladder system may be quickly and easily erected and various accessories quickly and easily attached thereto.

For example, elongate splice joint extrusions may be inserted into splice joint extrusion accommodation voids between adjacent rung sections to assemble a ladder of desirous length. The splice joint extrusions may frictionally engage or be held in place using frictional locking joint inserts or self tapping metal screws may be drilled through the stile extrusions into the splice joint extrusions therein.

Once assembled, accessories such as wall attachment brackets, safety cages and the like may be quickly and easily attached to the assembled rung sections using the attachment channels.

In embodiments, each accessory may comprise apertures which are spaced apart to collocate with a corresponding pair of the two attachment channels.

Furthermore, attachment fasteners having elongate fastener heads may be inserted through the accessory apertures into the collocated insertion spaces of the attachment channels thereunderneath. A locknut may be tightened about a protruding proximal threaded end of the attachment fasteners using only one spanner tool such that the fastener head rotates out of alignment within the connector head accommodation void so as to jam against the head engaging under edges.

The locknuts may be loosened to easily adjust the elevation of the accessories as may be required.

Furthermore, the attachment channels and the accessories may be configured such that a pair of accessories may be arranged front and back at the same elevation of the assembled ladder without interference. In this way, for example, the vertical elevation of a frontward safety cage may be adjusted without interfering with wall attachment bracket accessories therebehind.

In accordance with one aspect, there is provided a modular ladder system comprising a rung section comprising two elongate lateral stile extrusions and elongate rung extrusions spanning orthogonally therebetween, wherein each lateral stile extrusion defines an attachment side having an attachment face having two attachment channels being adjacent, parallel and longitudinally arranged along the attachment face, each channel having spaced apart inward facing rails which define an elongate insertion space therebetween and a relatively wider connector head accommodation void thereunderneath, each rail defining a connector head engaging under edge thereunderneath and a connection side adjacent to the attachment side, the connection side defining a splice joint extrusion accommodating void therein.

Attachment faces of the two elongate lateral stile extrusions may face oppositely.

The attachment faces of the two elongate lateral stile extrusions may face outwardly.

The rung extrusions may span between connection sides of the stile extrusions.

The splice joint extrusion accommodating void may have a width substantially equal to the adjacent extent of the longitudinal attachment channels.

The system may further comprise a further rung section and a pair of elongate splice joint extrusions located within respective adjacent splice joint extrusion accommodation voids.

The system may further comprise an elongate splice joint extrusion and wherein the splice joint extrusion accommodation voids and the elongate splice joint extrusion are substantially correspondingly rectangular.

The splice joint extrusion may comprise exterior frictional engagement nibs configured for frictionally engaging against an interior surface of the splice joint extrusion accommodation void in use.

The system may further comprise a splice joint locking insert for frictionally interfacing between an outer surface of the splice joint extrusion and corresponding respective inner surfaces of splice joint extrusion accommodating voids of opposingly coupled lateral stile extrusions.

The splice joint locking insert may comprise oppositely orientated co-planar tapered wing sections.

The system may further comprise a central splice joint spacer located between the tapered wing sections.

The central splice joint spacer may define a splice joint extrusion accommodation.

Cut-outs in the central splice joint spacer may define lateral stile extrusion accommodations for the longitudinal attachment channels.

A distal end of each tapered wing section may comprise an integral nib configured for locating within a corresponding aperture of the splice joint extrusion.

The system may further comprise a first accessory, the first accessory which may comprise a first pair of attachment apertures spaced apart to correspond with a first corresponding pair of the two attachment channels of the two elongate lateral stile extrusions.

The system may further comprise attachment fasteners configured for connecting the attachment to the first corresponding pair of the two attachment channels, each attachment fastener comprising an elongate fastener head having a width less than that of the insertion space and a length greater than the width of the insertion space and wherein the fastener head may be rotated out of alignment within a respective connector head accommodation void such that opposite under surfaces thereof engage against respective under edges of the respective connection slot.

The elongate fastener head may comprise angled ends which jam flush against opposite inner walls of the connector head accommodation void when rotated out of alignment.

The attachment fastener may comprise a proximal threaded stem which extends from a respective attachment aperture in use and further which may comprise a locknut engageable thereto and wherein tightening of the locknut causes the fastener head to rotate out of alignment with the attachment channel.

A proximal face of the threaded stem may comprise a rotational indicator.

Each attachment aperture may have a length greater than a length of the elongate fastener head.

The system may further comprise a further accessory, the further accessory which may comprise a further pair of apertures spaced apart to correspond with a second corresponding pair of the two attachment channels of the two elongate lateral stile extrusions and wherein the further accessory may be located on an opposite side of the first accessory with respect to the ladder.

The two attachment channels are sufficiently spaced apart and wherein the first and further accessories are configured such that first and further pair of apertures do not contact at the same elevation.

The accessory may be a wall bracket which may comprise a transverse member and orthogonal end members, the distal ends of each orthogonal end member which may comprise the attachment apertures and wherein the wall bracket may be sized such that the attachment apertures substantially collocate with the corresponding pair of attachment channels.

The accessory may be a ladder safety cage which may comprise upper and lower horizontal hoops, the proximal ends of each thereof which may comprise the attachment apertures and wherein the ladder safety cage may be sized such that the attachment apertures substantially collocate with the corresponding pair of attachment channels.

The system may further comprise an adjustable fixing bracket having an adjusting plate which may comprise an aperture, for fastening to a pair of attachment channels of the lateral stile extrusion in a pivotable manner.

The adjustable fixing bracket may be length adjustable, and may comprise profile channel extrusions, within which respective adjusting plates locate and are able to slide.

The adjustable fixing bracket profile channel extrusion further may comprise a lip-edged cross-section and a central attachment channel therealong, and wherein each adjusting plate may have an aft aperture through which an attachment fastener may extend for fastening the adjusting plate with respect to the profile channel extrusion.

The system may further comprise a vertical fall arrest mechanism which may comprise a traveller track extrusion configured for coupling to one of the attachment channels, and a fall arrest traveller device configured to travel along the traveller track extrusion, and wherein the fall arrest traveller device may comprise an arrest lever which may comprise a fulcrum pin and user attachment point aperture, and wherein when a downward force may be applied to the arrest lever, the fall arrest traveller device jambs onto the traveller track extrusion.

The fall arrest traveller device may comprise a body defining a profiled channel thereunderneath, for slidably accommodating a corresponding T-shaped guide head of the traveller track extrusion, and wherein the arrest lever pivots around a fulcrum pin such that, when a downward force is applied to the user attachment point aperture, the opposite end of the arrest lever jambs against the T-shaped guide head of the traveller track extrusion.

According to another aspect, there is provided a method of erecting a modular ladder system comprising a rung section comprising two elongate lateral stile extrusions and elongate rung extrusions spanning orthogonally therebetween, wherein each lateral stile extrusion defines an attachment side having an attachment face having two attachment channels being adjacent, parallel and longitudinally arranged along the attachment face, each channel having spaced apart inward facing rails which define an elongate insertion space therebetween and a relatively wider connector head accommodation void thereunderneath, each rail defining a connector head engaging under edge, and a connection side adjacent to the attachment side, the connection side defining a splice joint extrusion accommodating void therein, the method comprising: inserting pairs of elongate splice joint extrusions into respective adjacent splice joint extrusion accommodation voids of adjacent rung sections; attaching an accessory, the accessory comprising attachment apertures spaced apart to correspond with a pair of the attachment channels, wherein attaching an accessory comprises inserting attachment fasteners through the attachment apertures into elongate insertion spaces thereunderneath, the attachment elongate fastener head comprising a width less than that of the elongate insertion space and a length greater than the width of the elongate insertion space and the method further comprising tightening a locknut to a proximal protruding threaded stem of the fastener such that the elongate head rotate out of alignment with the respective attachment channel to engage respective connector head engaging under edges thereof.

Other aspects are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which:

FIGS. 22-23 show rung extrusions in accordance with embodiments;

FIG. 34 shows a perspective view and side elevation of the modular ladder system fastened at an angle to a wall;

DESCRIPTION OF EMBODIMENTS

Figure 1:
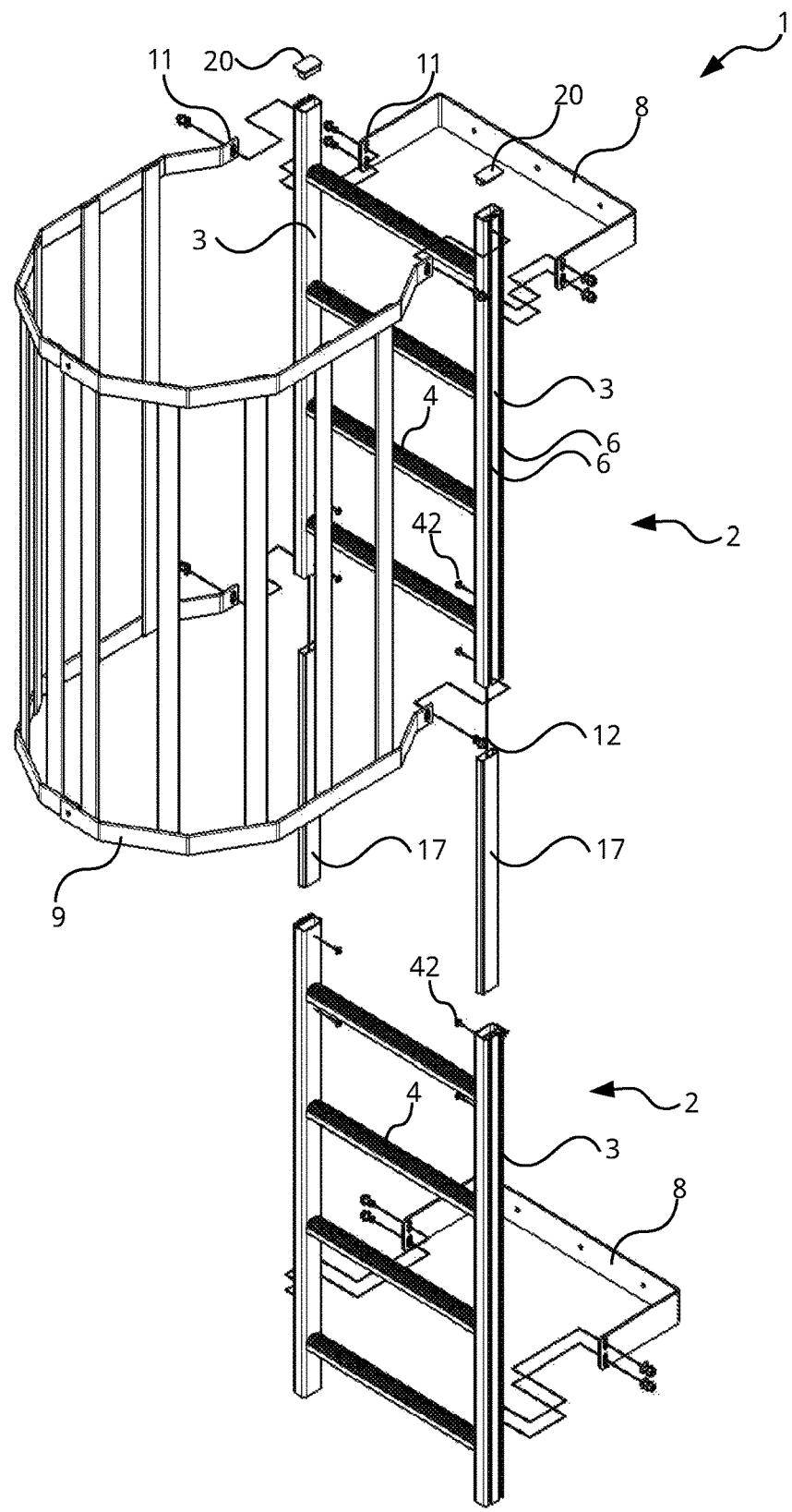
FIG. 1 shows an exemplary assembly perspective view of a modular ladder system in accordance with an embodiment.
Figure 2:
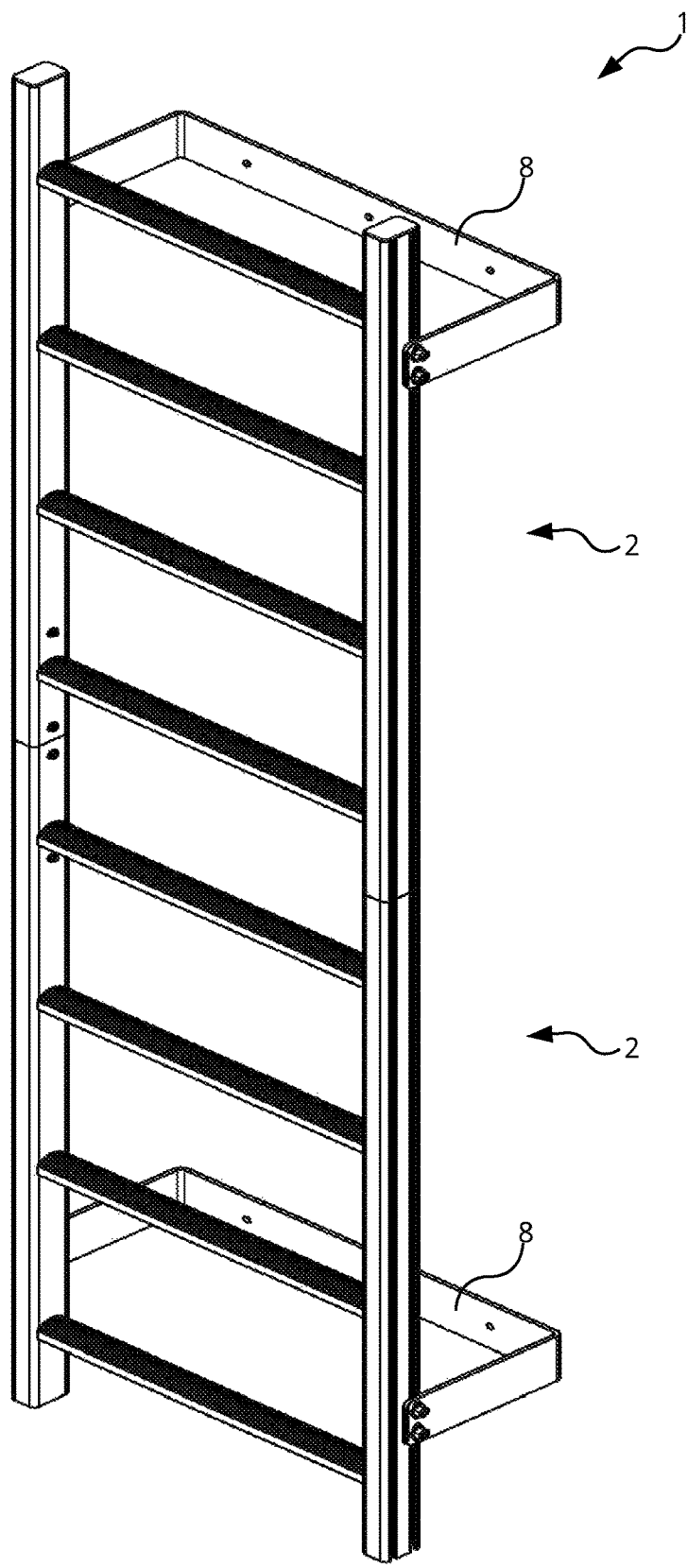
FIG. 2 shows a perspective view of an assembled pair of rung sections and rearward upper and lower wall brackets, in accordance with an embodiment.
Figure 3:
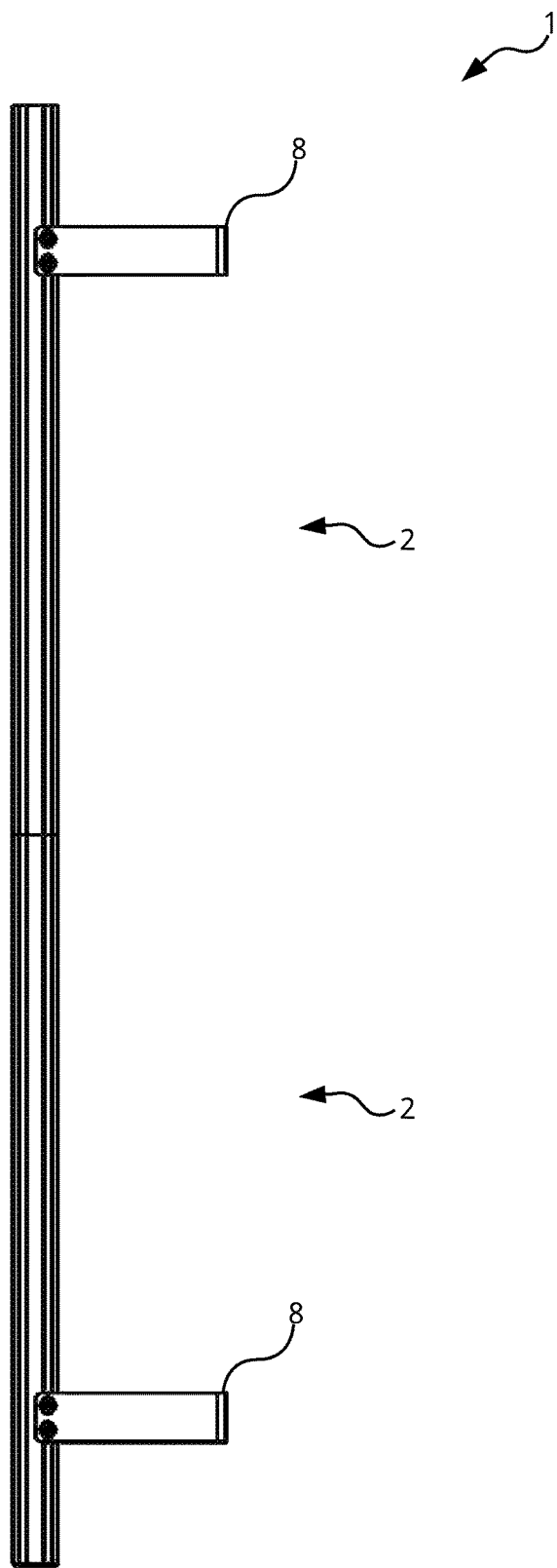
FIG. 3 shows a side elevation view of the assembly of FIG. 2.
Figure 4:
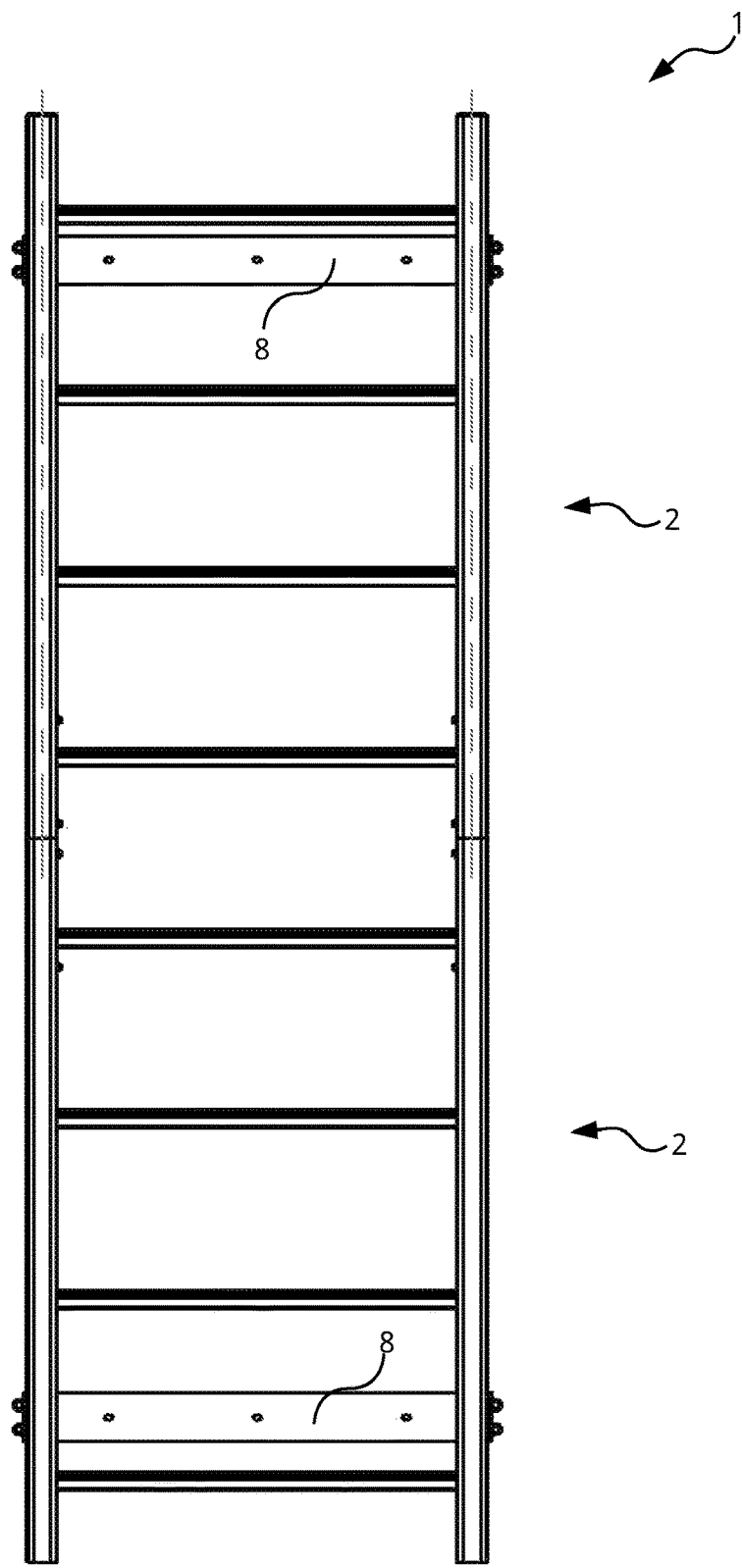
FIG. 4 shows a front elevation view of the assembly of FIG. 2.
Figure 5:
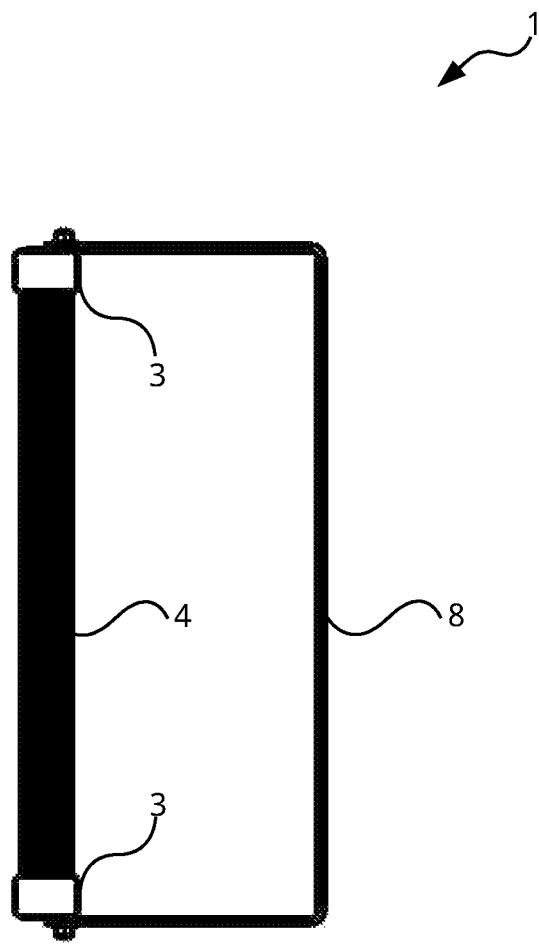
FIG. 5 shows a top plan view of the assembly of FIG. 2.
Figure 6:
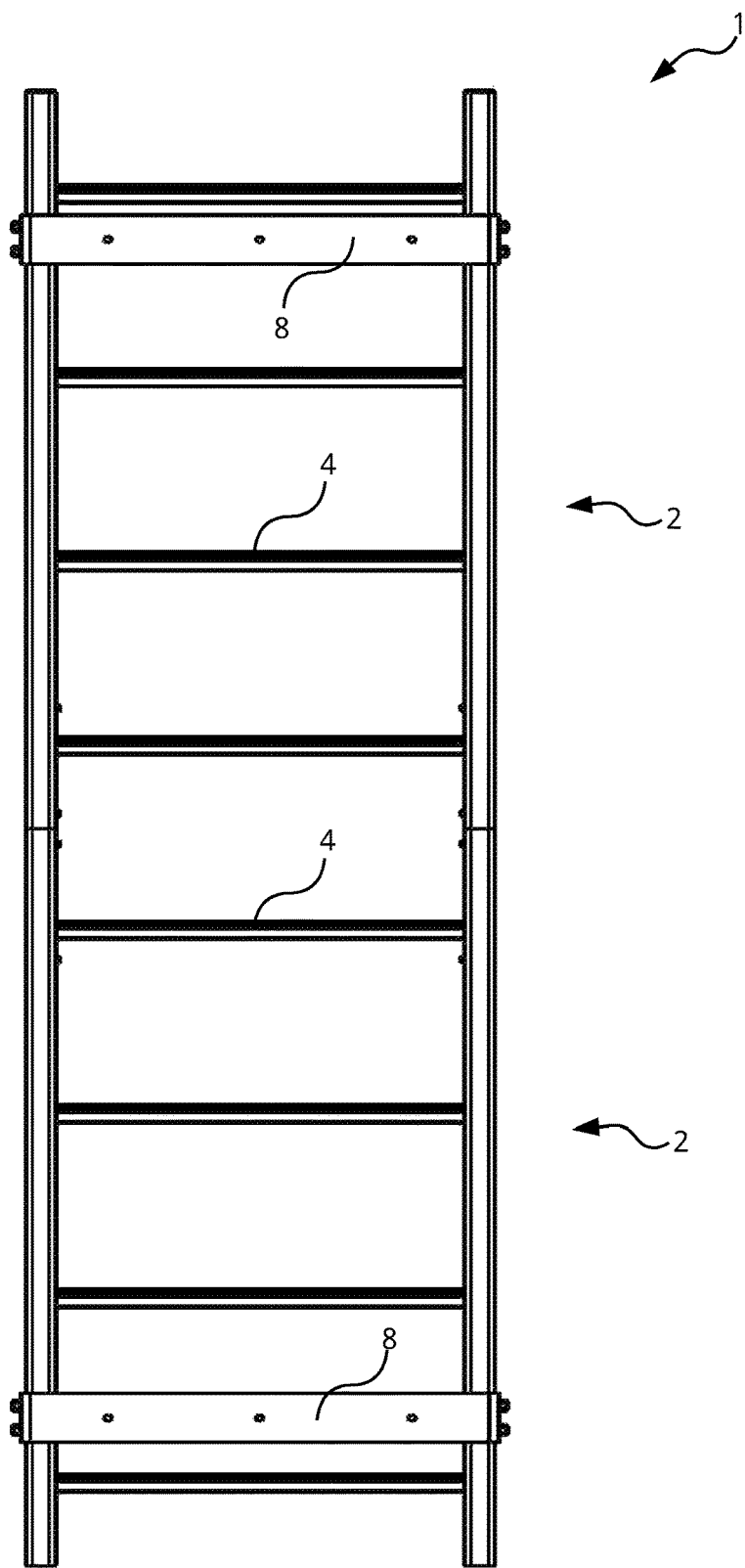
FIG. 6 shows a rear elevation view of the assembly of FIG. 2.

FIGS. 1-6 show exemplary assembly and perspective views, elevation and plan views of a modular ladder system 1. The modular ladder system 1 comprises a plurality of rung sections 2. Each rung section 2 comprises lateral stile extrusions 3 and rung extrusions 4 spanning orthogonally therebetween.

FIGS. 22-23 show two profiles of two embodiments of the rung extrusions 4 in further detail. According to the first embodiment shown in FIGS. 22A and 23A, the upper surface thereof may be convex and comprise frictional tread having longitudinal parallel grooves and the lower surface thereof may be planar.

The further embodiment shown in FIGS. 22B and 23B shows the rung extrusion 4 comprising a planar upper surface wherein the lower surface thereof may be convex. In accordance with this embodiment, both the upper and lower surfaces may comprise frictional tread having longitudinal parallel grooves.

The rung extrusions 4 may be attached to the stile extrusions 3 by means of an automatic welding process.

Figure 7:
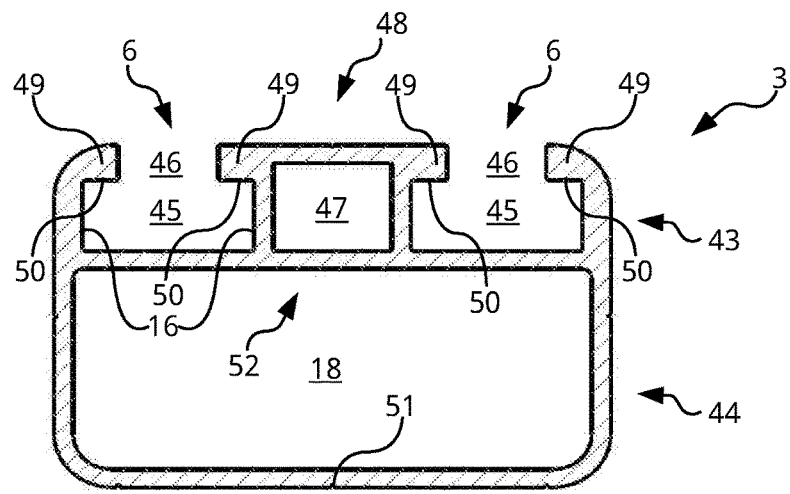
FIGS. 7-9 show a stile extrusion in accordance with an embodiment.
Figure 8:
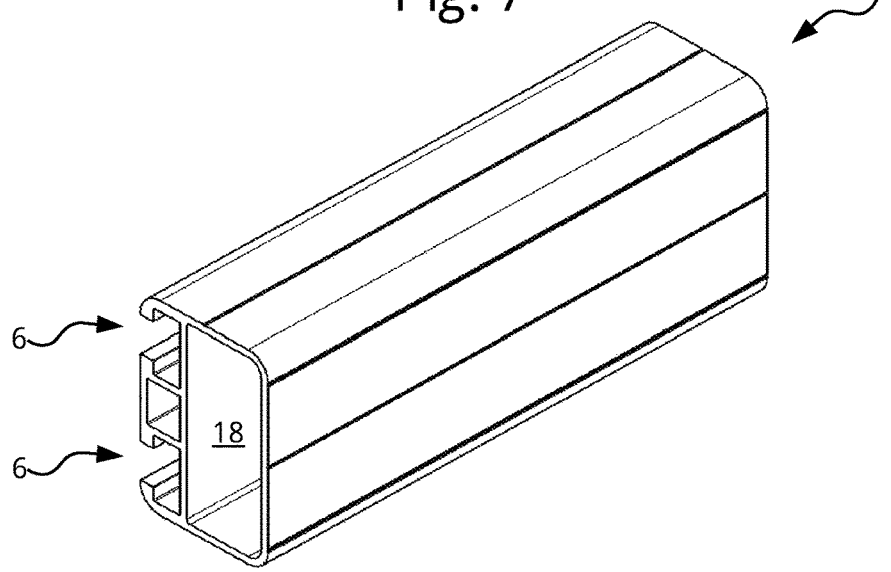
Figure 9:
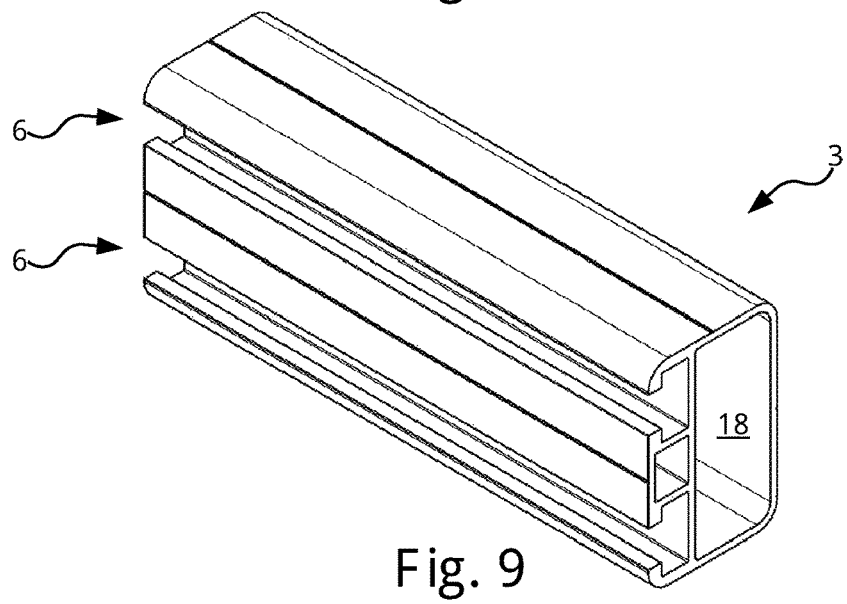
Figure 10:
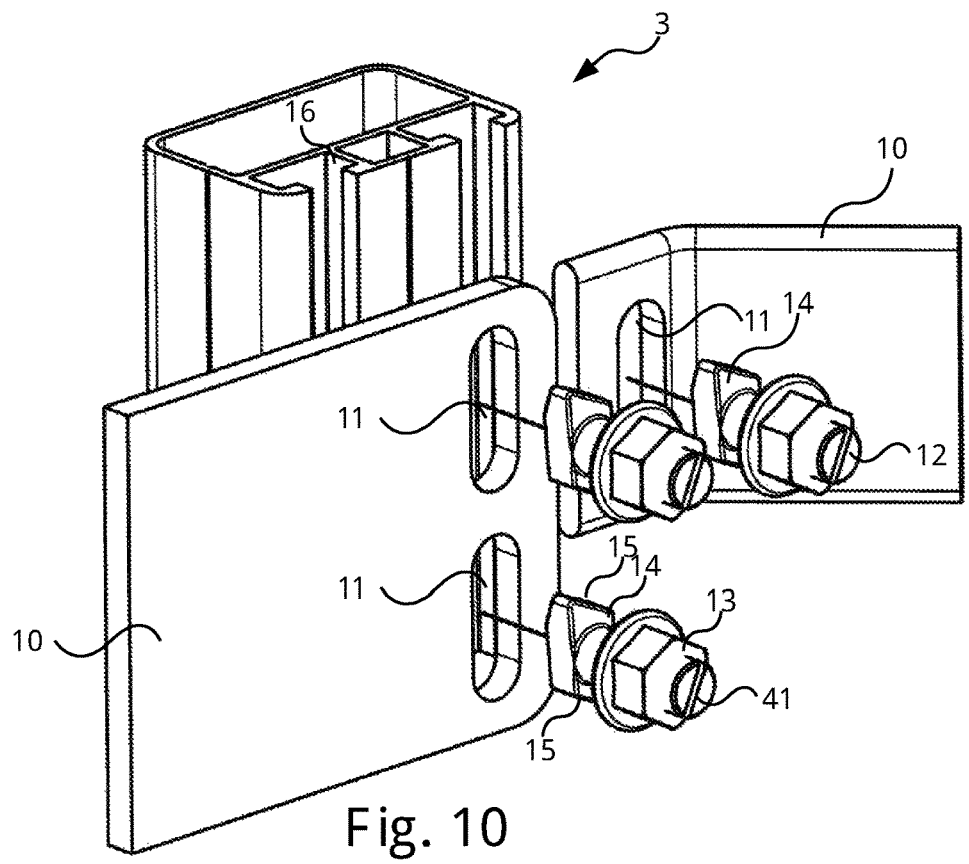
FIGS. 10-19 show the manner of attachment of accessories, utilising the longitudinal attachment channels of the stile extrusion in accordance with an embodiment.
Figure 11:
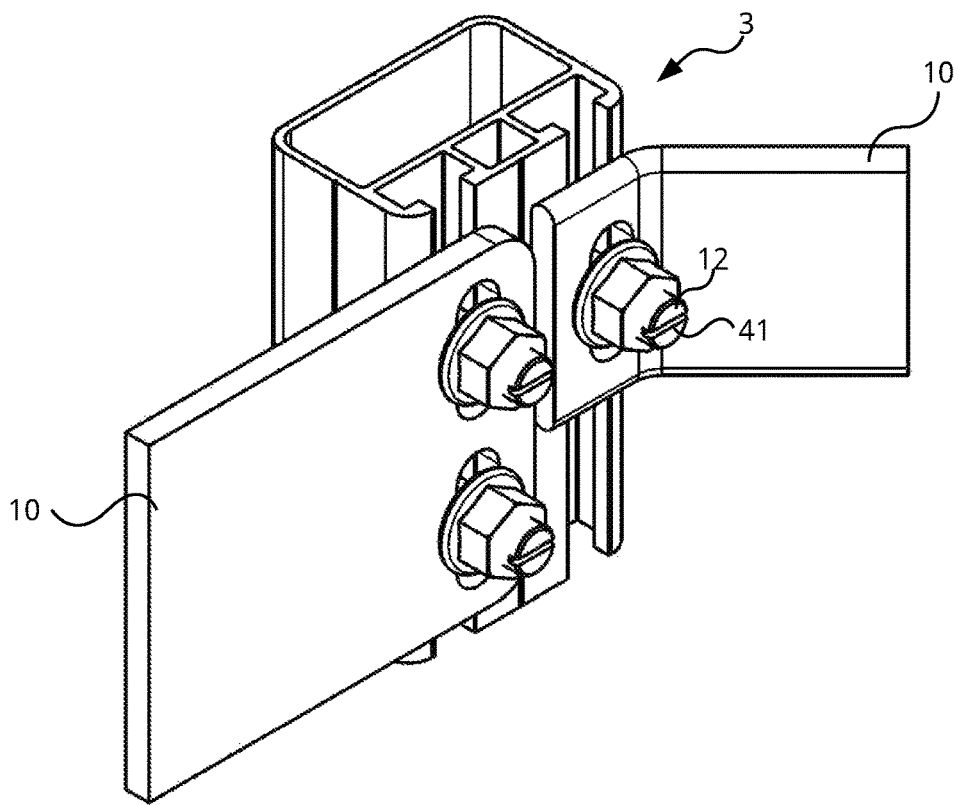
Figure 12:
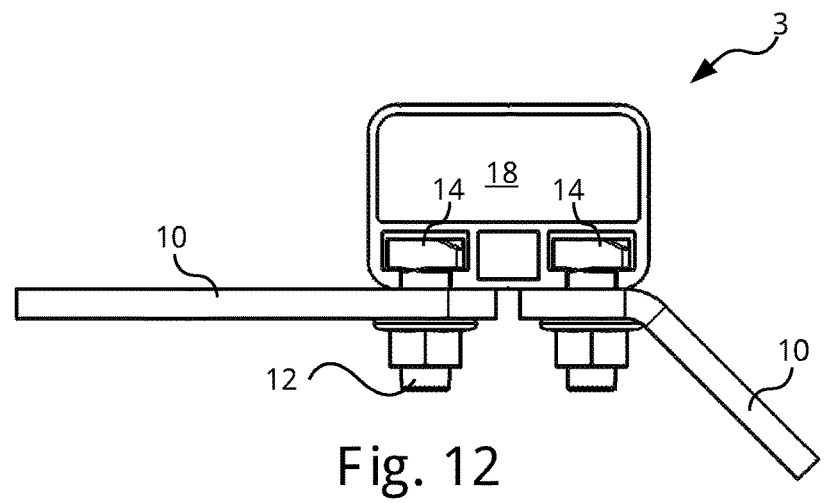
Figure 13:
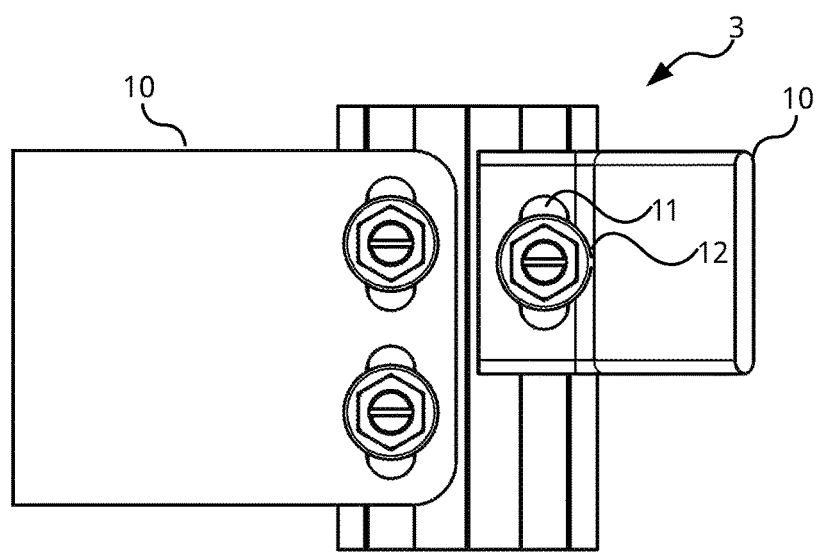
Figure 14:
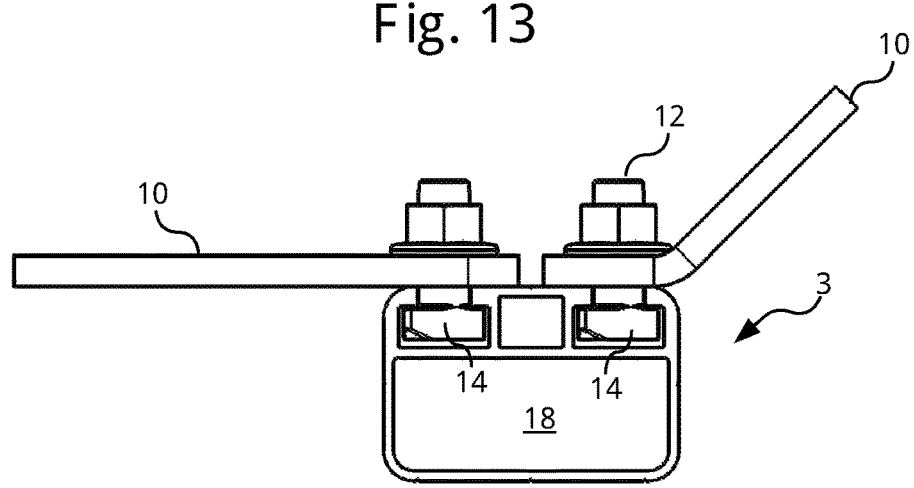
Figure 15:
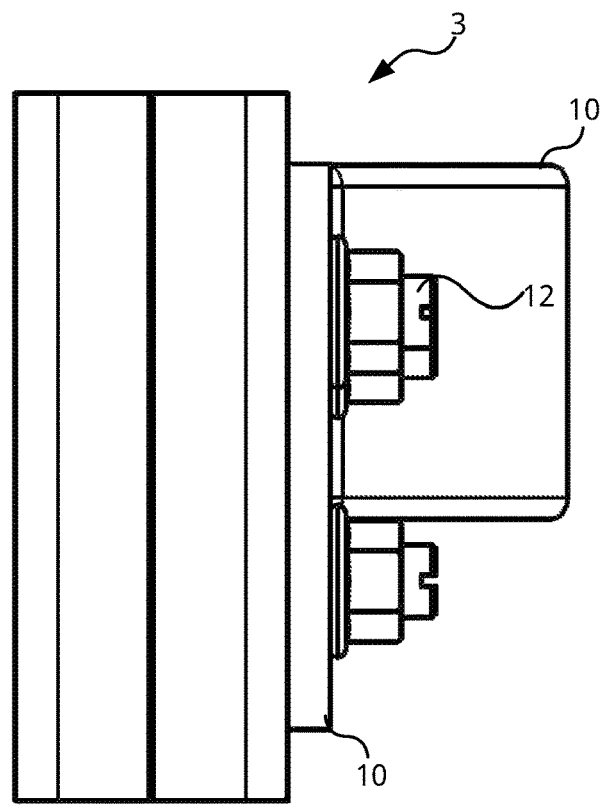
Figure 16:
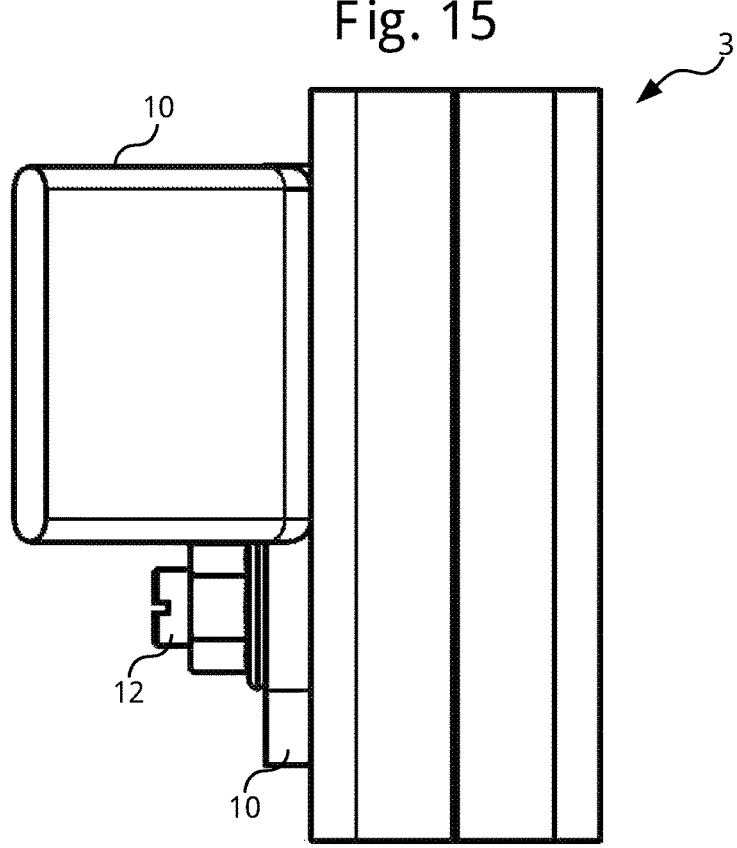
Figure 17:
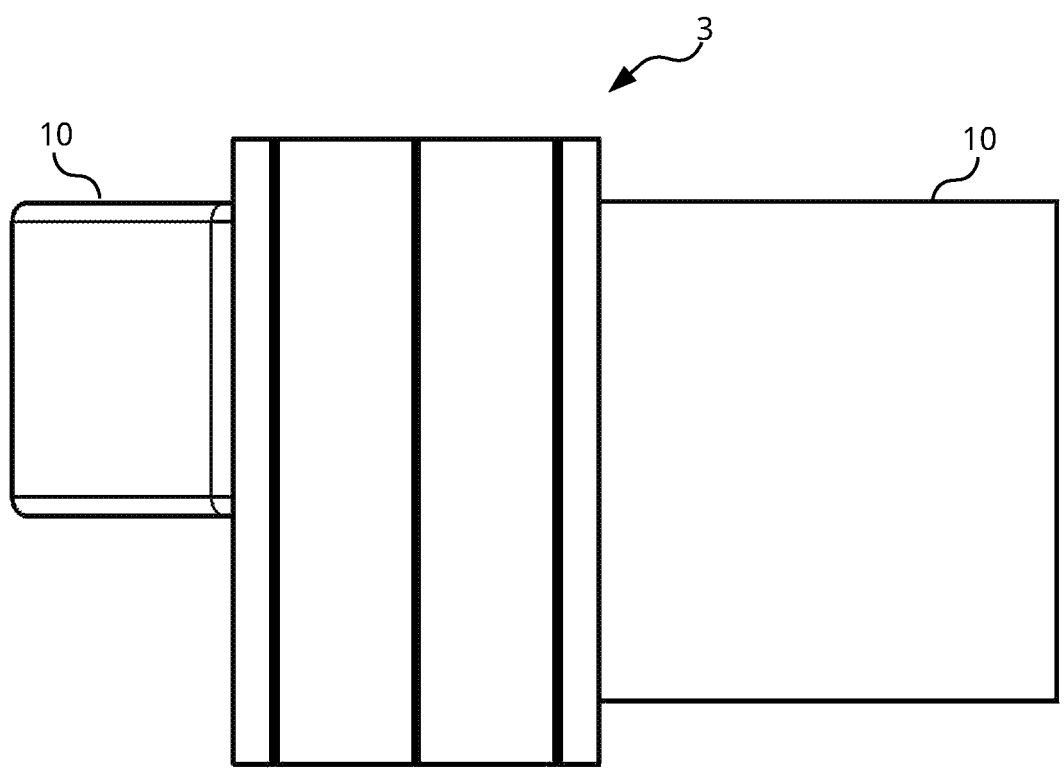

FIGS. 7-9 show profiles of the stile extrusions 3 in further detail in accordance with an embodiment.

With reference to FIG. 1, each rung section 2 may comprise two elongate lateral stile extrusions 3 and elongate rung sections 4 spanning orthogonally therebetween.

As can be seen from FIG. 7-9, the stile extrusion 3 may comprise an attachment side 43 having an attachment face 48. The attachment face 48 defines two attachment channels 6. Each attachment channel 6 is adjacent on the same side 43 of the extrusion 3 and are arranged parallel and longitudinally along the attachment face 48.

Each channel 6 may have inward facing rails 49 which define an elongate insertion space 46 therebetween and a relatively wider connector head accommodation void 45 thereunderneath. Furthermore, each rail 49 may define a connector head engaging under edge 50.

The stile extrusion 3 may further define a connection side 44 oppositely adjacent to the attachment side 43. The connection side 44 may define a splice joint extrusion accommodation void 18 therein.

Figure 43:
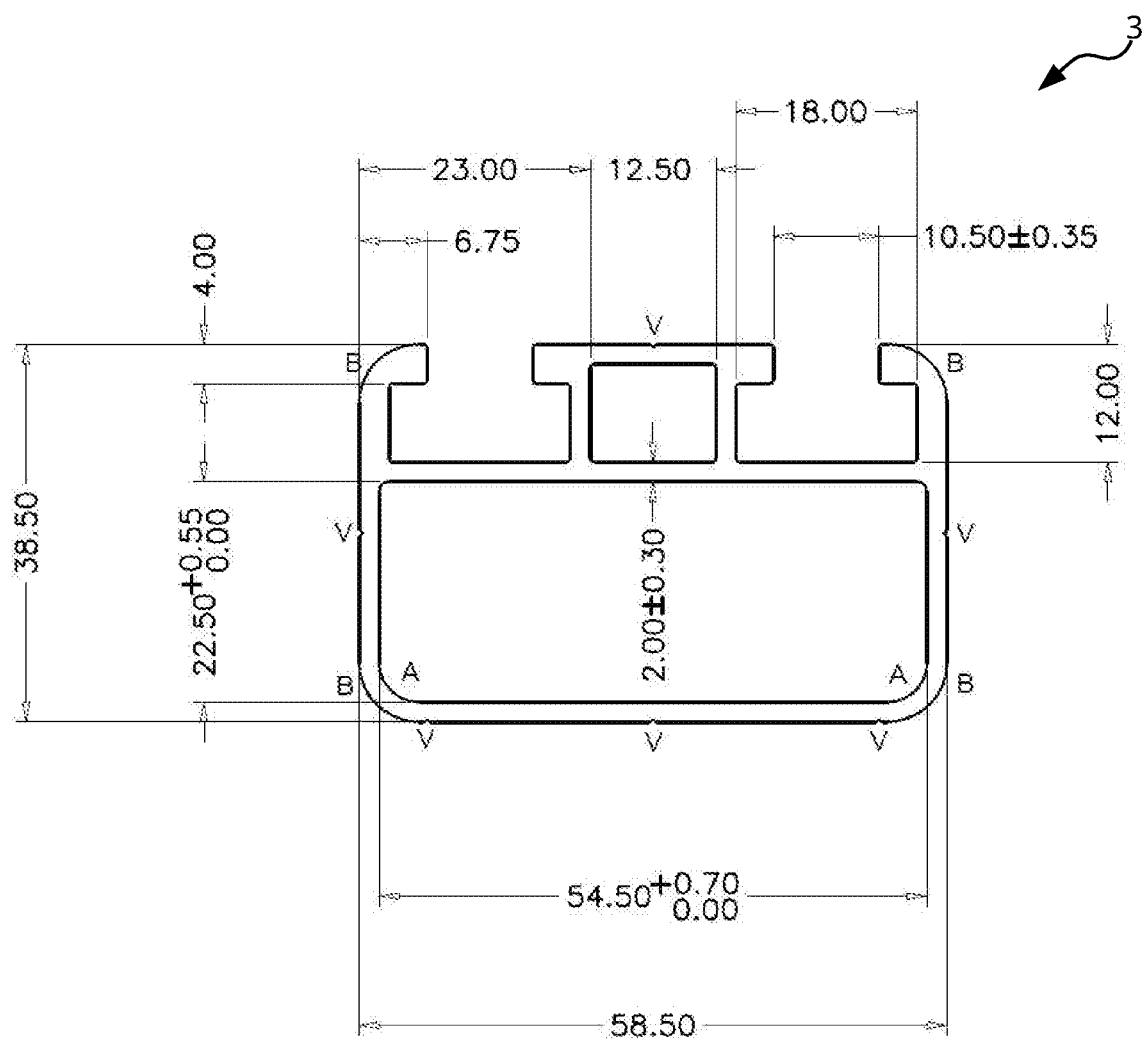
FIG. 43 shows exemplary dimensions of the stile extrusion in accordance with an embodiment.

The attachment channels 6 may be spaced apart so that accessories 10 respectively attached oppositely thereto have sufficient space so as to not interfere with each other at the same elevation as shown in FIG. 1. In this regard the extrusion 3 may define a central portion 52 which may comprise a void 47 therealong. Exemplary dimensions of the stile extrusion 3 are given in FIG. 43.

With reference to FIG. 1, the splice joint extrusions 17 may be inserted into the splice joint accommodation voids 18 of adjacent stile extrusions 3 of adjacent rung sections 2. These splice joint extrusions 17 may be held in place using the frictionally engaging splice joint locking insert 22 described hereunder or alternatively self-tapping metal screws 42 (such as Tekscrews™).

The connection side 44 may comprise a groove 51 which may centrally guide the self-tapping fastener screw therethrough in use.

Furthermore, in the embodiments shown in FIG. 1, the attachment sides 43 face oppositely and outwardly/laterally from each rung section 2 and the rungs 4 span between the connection sides.

Thereafter, accessories 10, such as the rearward wall bracket 8 or the forward safety cage 9, may be attached to respective fore and aft pairs of the attachment channels 6. In this regard, the accessories 8 and 9 may comprise connection apertures 11 which are spaced apart so as to collocate with respective opposite pairs of attachment channels 6.

Attachment fasteners 12 having an elongate head 14 having a width less than that of the elongate insertion space 46 and a length greater than the width of the elongate insertion space 46 may be inserted via the connection apertures 11 of the accessories 8 and 9 into the connector head accommodation void 45 therein. Thereafter, a locknut 13 may be tightened around a proximal protruding threaded stem 54 of the attachment fastener 12 such that the elongate head 14 thereof rotates out of alignment with the respective attachment channel 6 such that opposite under surfaces thereof jam against the under edges 50 of the rails 49, thereby entrapping the elongate head 14 and therefore the attachment fastener 12 therein.

Opposite angled faces 15 of the elongate head 14 may jam flush against the opposite inner walls 16 of the accommodation voids 45 so as to limit the rotational extent of the elongate head 14.

FIGS. 10-16 show this manner of attachment in further detail. Each ladder accessory 10 may comprise one or more of the connection apertures 11, which may be elongate so as to have a length greater than that of the attachment fastener elongate head 14. The connection apertures 11 may be spaced so as to locate over the respective longitudinal attachment channels 6 for attachment.

The elongate heads 14 of the attachment fasteners 12 may then inserted in-line through the elongate apertures 11 and elongate insertion spaces 46 of the longitudinal attachment channels 6 thereunderneath to locate within the connector head accommodation voids 45 therein.

Flanged serrated hexagonal locknuts 13 may then screwed onto the threaded stems 54 of the attachment fasteners 12, which when tightened cause the attachment fasteners 12 to rotate such that the elongate heads 14 jam within the longitudinal attachment channels 6 against the inner facing walls 16 of the connector head accommodation void 45.

The proximal end of each attachment fastener 12 may comprise a rotational indicator 41, such as a slot, marking or the like, indicative of the rotational orientation of the attachment fastener 12, which may be utilised during installation to ensure adequate securement. Specifically, in the fastened configuration as is substantially shown in FIG. 11, the rotational indicator 41 is horizontal, indicative of the adequate securement of the elongate head 14 within the respective longitudinal attachment channel 6.

For detachment, the hexagonal locknuts 13 may be similarly loosened, so as to allow the elongate heads 14 of the attachment fasteners 12 to be brought from the longitudinal attachment channels 6 and corresponding elongate apertures 11 in-line. As can be seen from at least FIG. 10, the opposite ends of the elongate head 14 comprise planar angled faces 15 which, when rotated clockwise given the orientation shown in FIG. 10, lie substantially flush against the opposing inner walls 16 of the connector head accommodation void 45 of the longitudinal attachment channel 6.

With reference to FIG. 1, a plurality of ladder accessories may therefore be attached to the rung sections 2 wherein, in the embodiment shown, the modular ladder system 1 may comprise upper and lower wall brackets 8 and an elevated ladder safety cage 9 for example.

Figure 18:
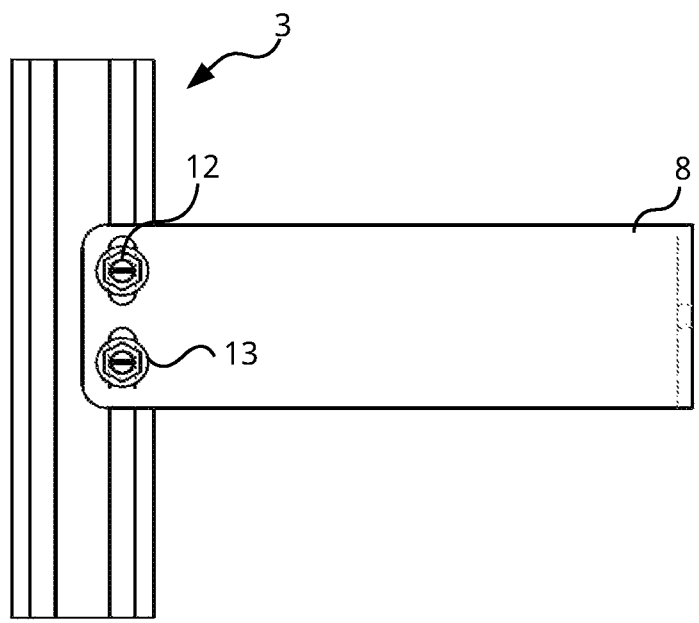
Figure 19:
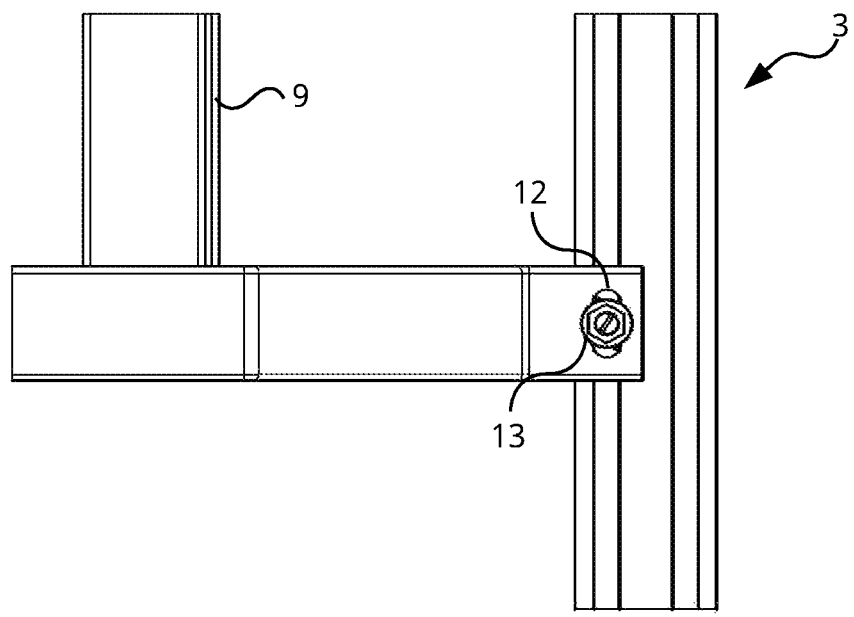

FIG. 18 shows the connection ends of the wall bracket 8 being fastened using a pair of attachment fasteners 12 and hexagonal locknuts 13. FIG. 19 shows each upper and lower hoops of the ladder safety cage 9 being fastened using a single attachment fastener 12 and hexagonal locknut 13.

As is further shown in FIG. 1, the rung sections 2 may be joined together utilising splice joint extrusions 17, which insert through respective splice joint extrusion accommodating voids 18 at the ends of adjacent stile extrusions 3, and which may be fixed by self-tapping metal screws 42.

Figure 20:
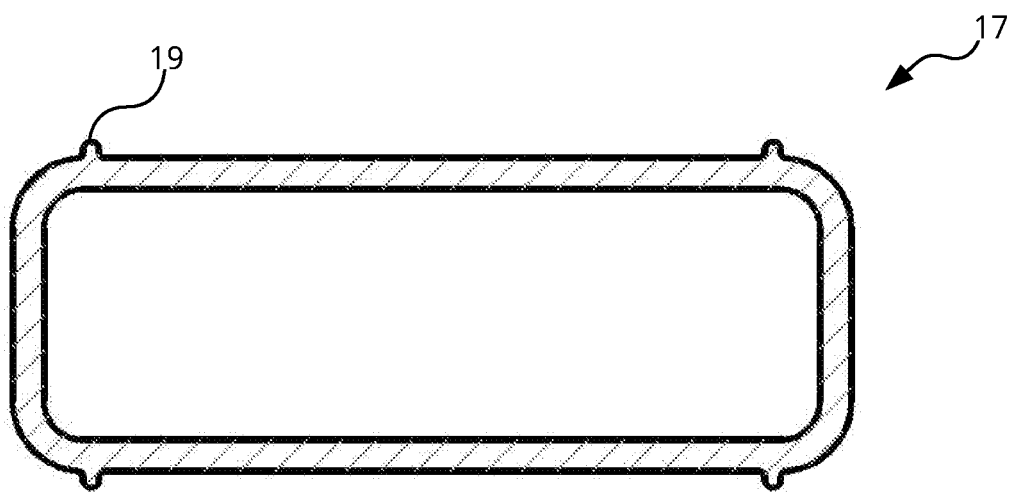
FIGS. 20-21 show a splice joint extrusion in accordance with an embodiment.
Figure 21:
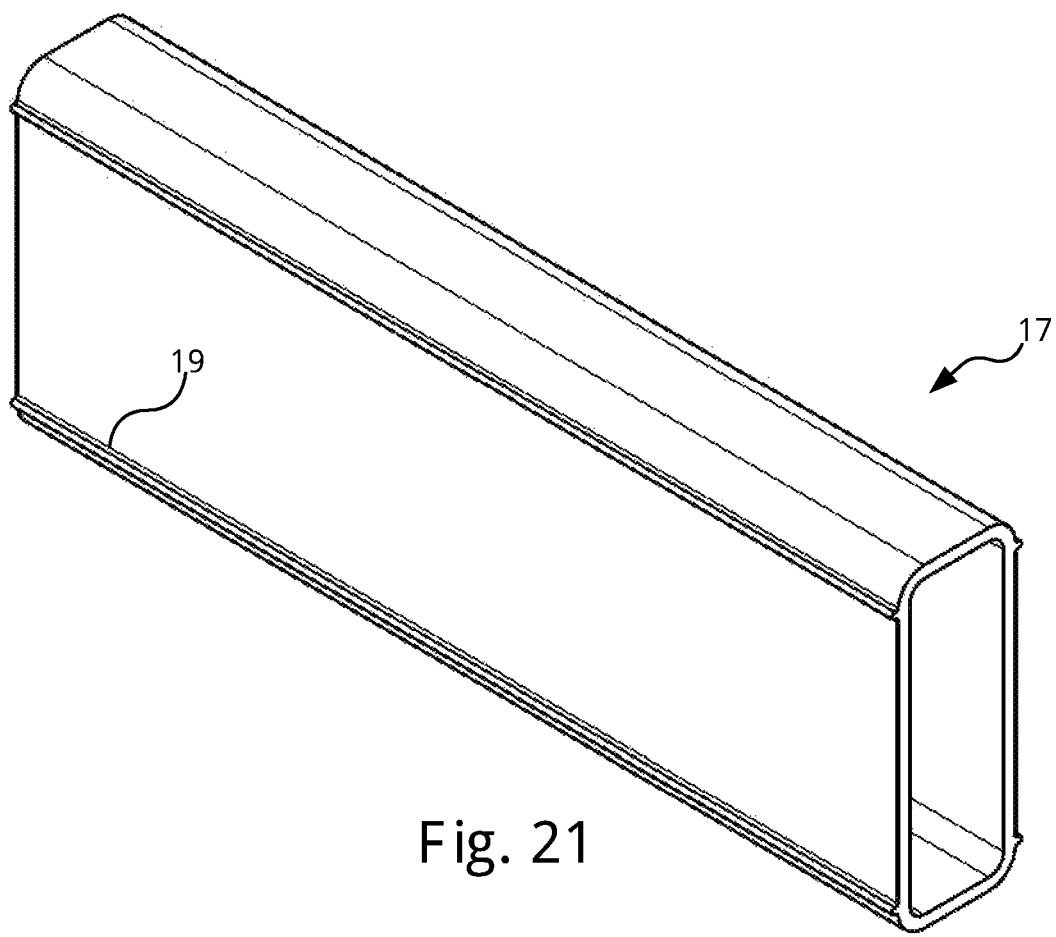

FIGS. 20-21 show the profile of the splice joint extrusion 17 in further detail in accordance with an embodiment wherein the splice joint extrusion 17 comprises a substantially rectangular cross-section with rounded corners. Furthermore, the exterior lateral faces of the splice joint extrusion 17 may comprise longitudinal frictionally engagement nibs 19, for frictionally engaging within the splice joint accommodation void 18 of the stile extrusion 3.

Referring to FIG. 1, a modular ladder system 1 of differing lengths may be constructed using the splice joint extrusions 17 to interconnect a plurality of ladder rung sections 2 in this manner. The ends of the stile extrusions 3 may be enclosed with HDPE end caps 20.

Figure 24:
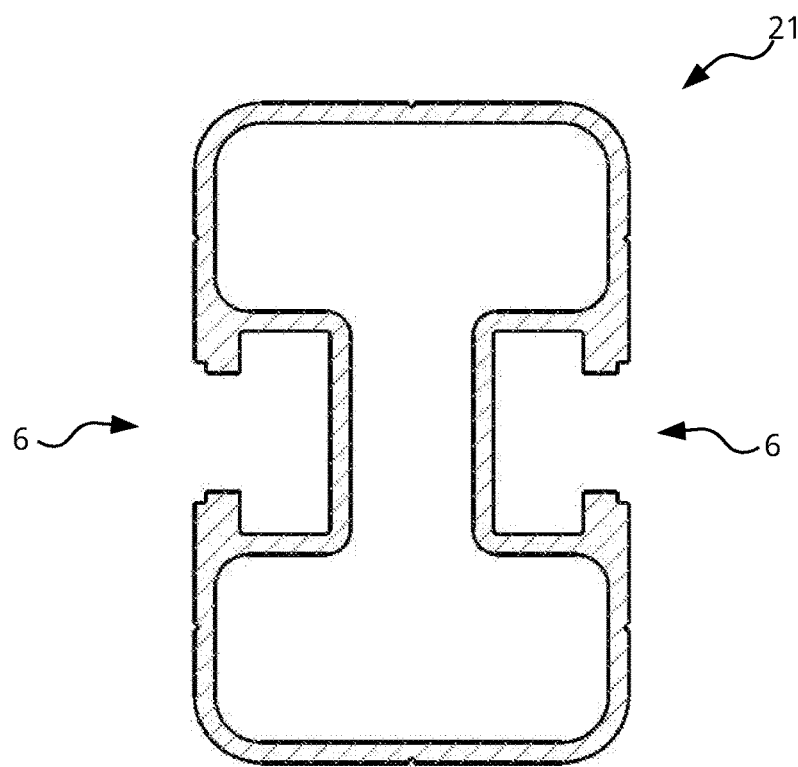
FIGS. 24-25 show a multi-purpose attachment extrusion in accordance with an embodiment.
Figure 25:
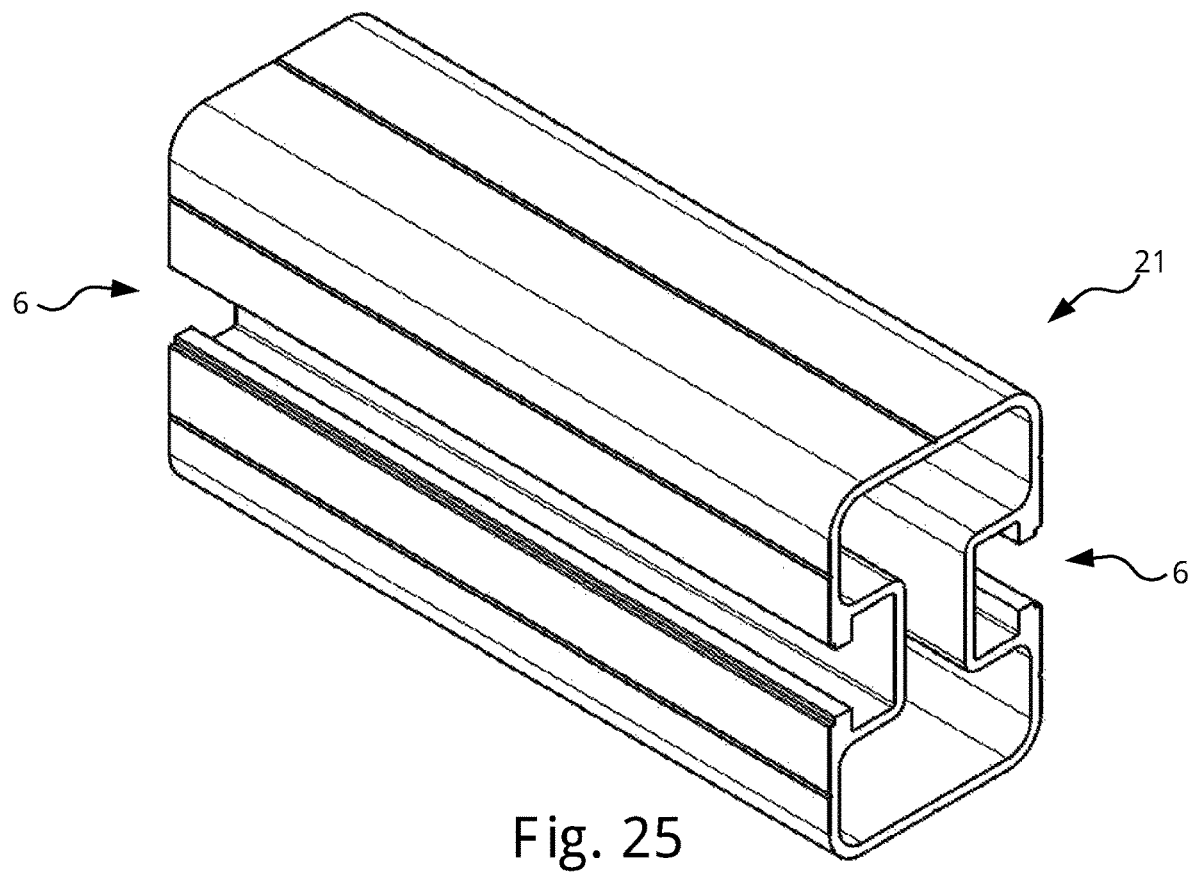

FIGS. 24-25 show the profile of a multi-purpose attachment extrusion 21, which may be utilised for special applications or configurations of the modular ladder system 1, in conjunction with other access systems including platforms and landings, walkways and cross-overs and the like. The multi-purpose attachment extrusion 21 may comprise dual oppositely located longitudinal and parallel attachment channels 6, which may be utilised for the attachment of attachment fasteners 12 in the manner described above.

Figure 26:
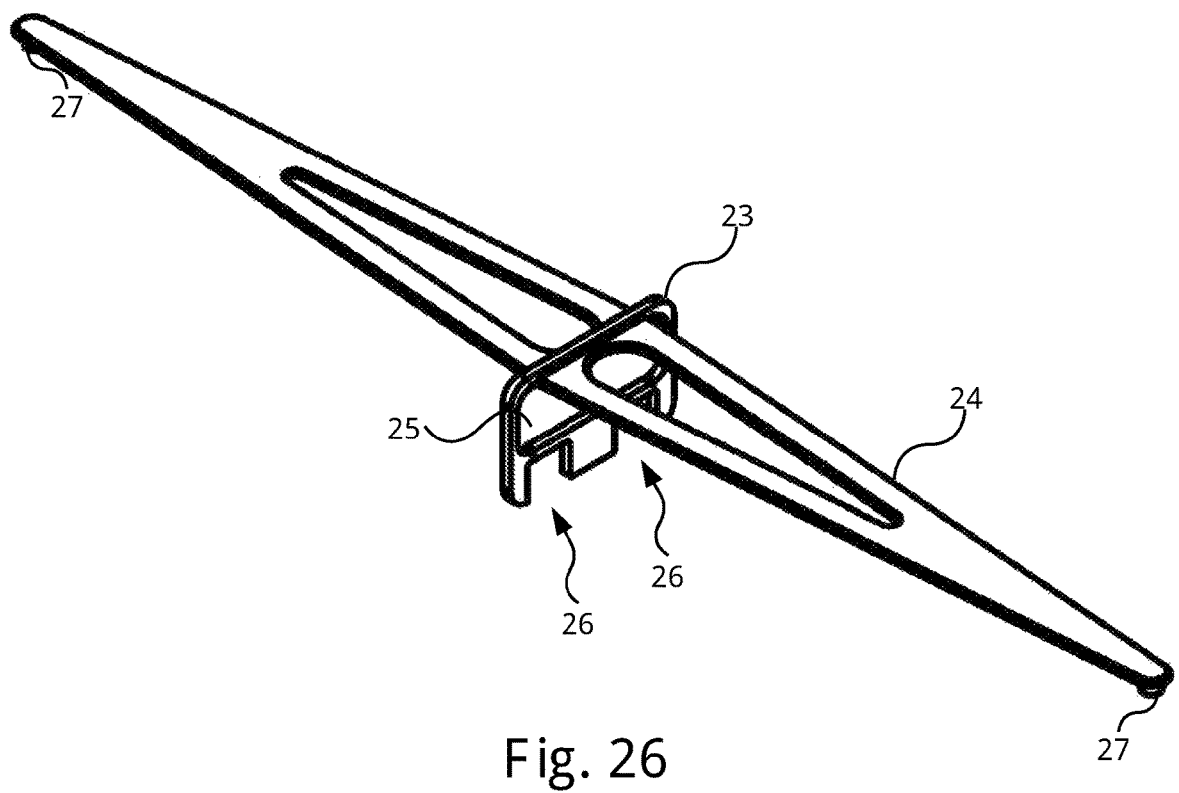
FIGS. 26-29 show a splice joint locking insert in accordance with an embodiment.
Figure 27:
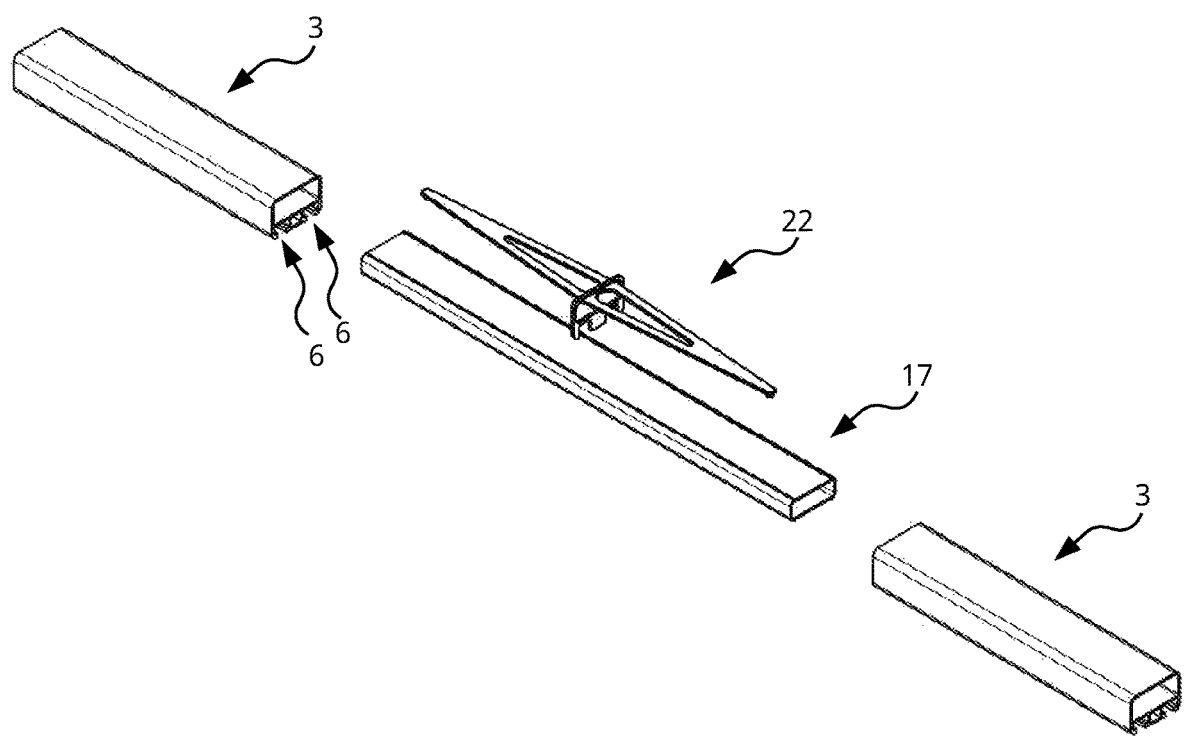

FIGS. 26-27 show a splice joint locking insert 22, which may be utilised for facilitating the interlocking of opposing stile extrusions 3 about a splice joint extrusion 17. The splice joint locking insert 22 may comprise a central splice joint spacer 23, and tapered wing sections 24 extending oppositely therefrom.

The splice joint locking insert 22 may be manufactured from HDPE or other suitable plastic material, and may facilitate the frictional engagement between the opposing stile extrusions 3 and the splice joint extrusion 17.

Each wing section 24 may comprise a tapered profile as shown. Frictional resistance may increase gradually as the opposing stile extrusions 3 and the splice joint extrusion 17 are brought together with the splice joint locking insert 22 therebetween.

The central splice joint spacer 23 may comprise an insert void 25, through which the splice joint extrusion 17 inserts. Furthermore, the central splice joint spacer 23 may comprise dual attachment channel cut-outs 26, to allow for the elongate attachment channels 6 of the opposing stile extrusions 3.

Each tapered wing section 24 of the splice joint locking insert 22 may comprise a distal locking nib 27, for locating within corresponding apertures (not shown) drilled into the splice joint extrusion 17 for correctly locating the splice joint locking insert 22 with respect to the splice joint extrusion 17.

Figure 28:
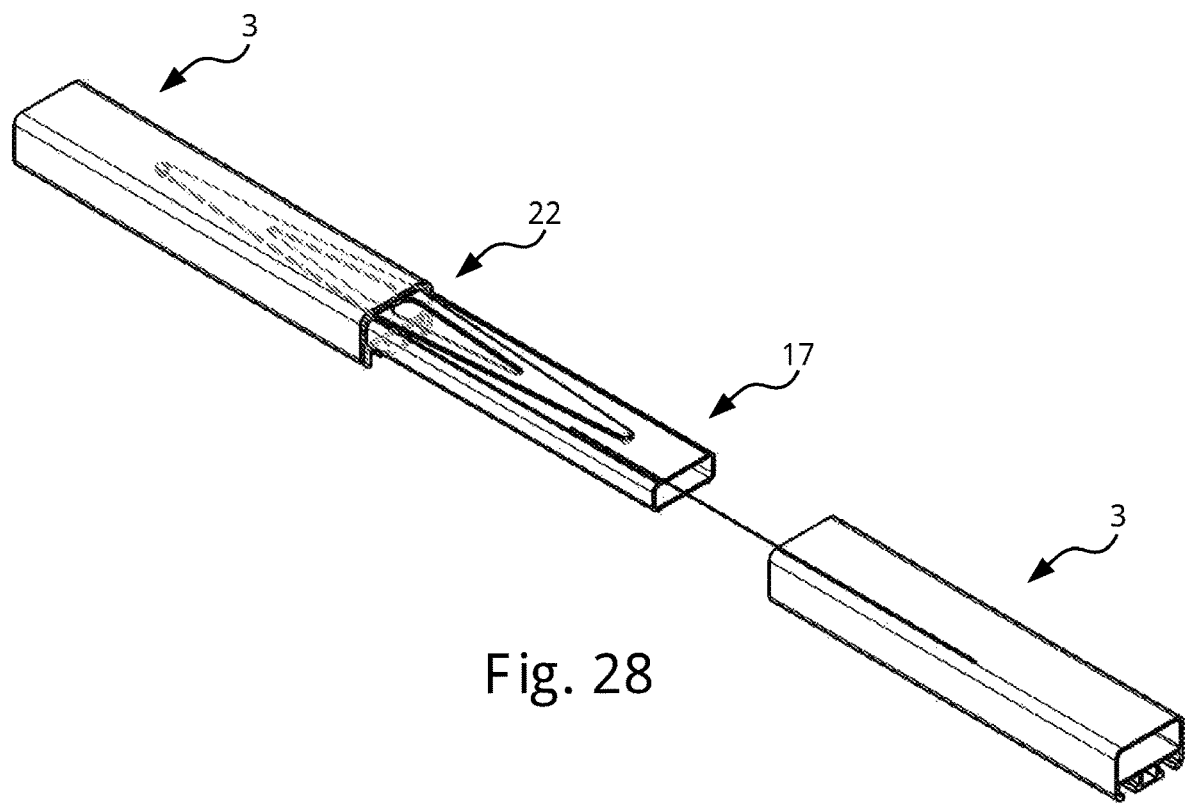
Figure 29:
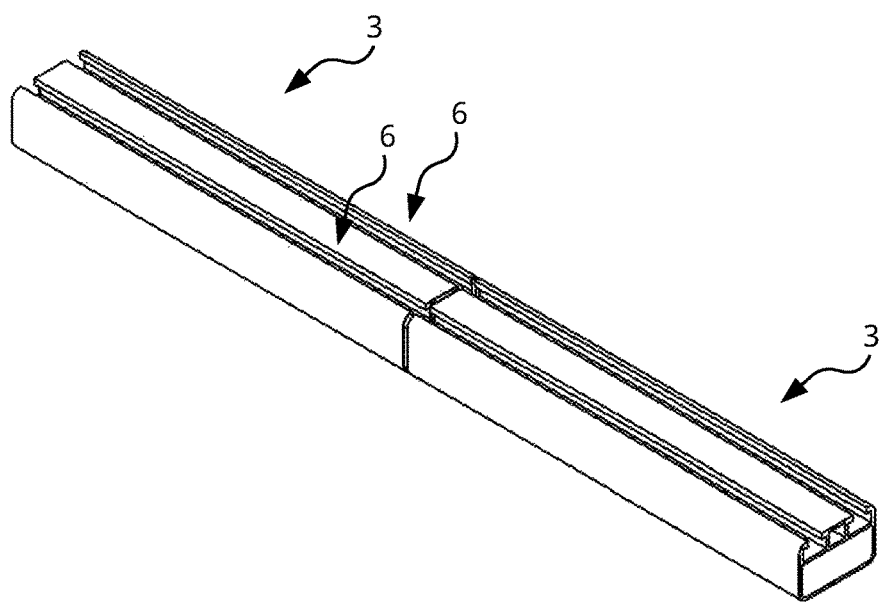

FIG. 28 shows the splice joint locking insert 22 having been attached to the splice joint extrusion 17 and inserted into one of the opposing stile extrusions 3. FIG. 29 shows an underside view of the two opposing stile extrusions 3 inter-connected, utilising the splice joint extrusion 17 and the splice joint locking insert 22.

Figure 30:
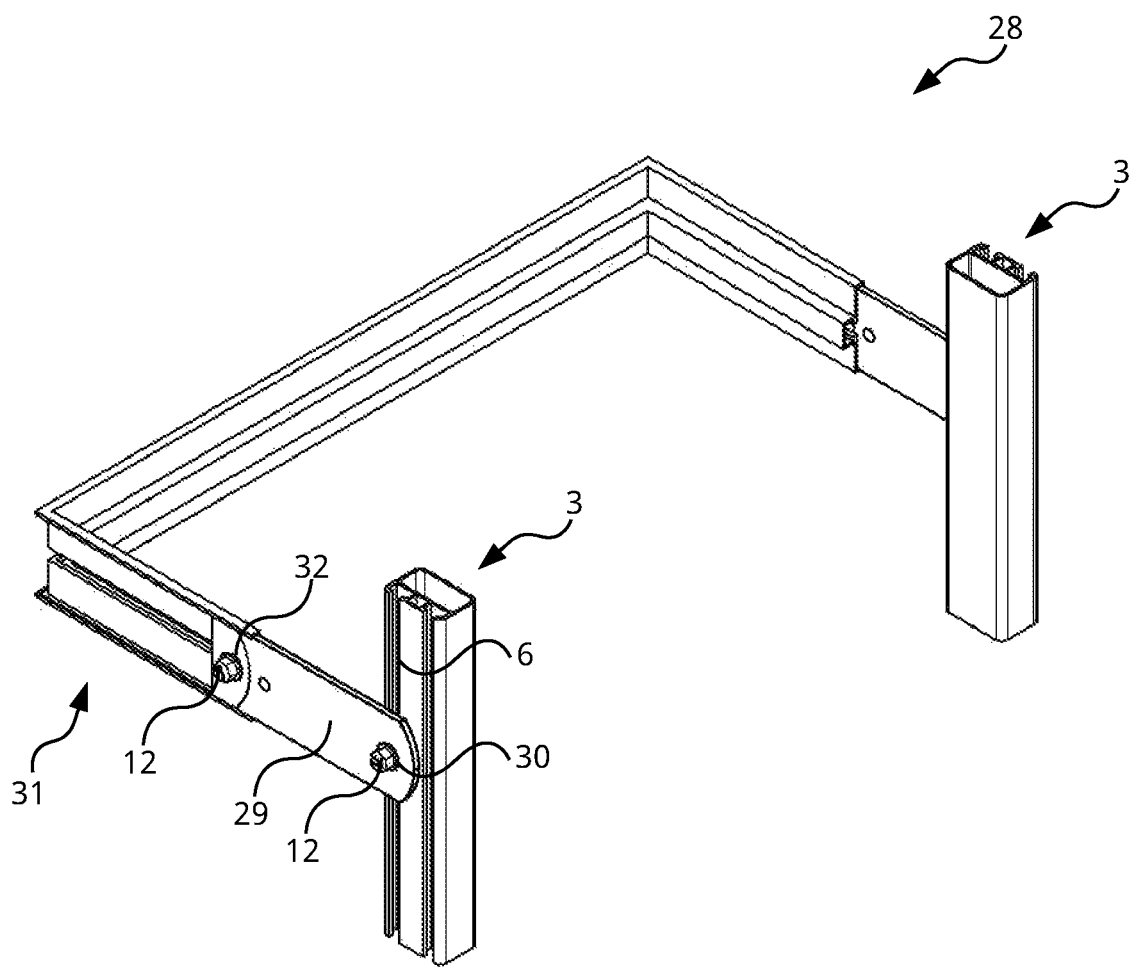
FIGS. 30-33 show an adjustable fixing bracket in accordance with an embodiment.
Figure 35A:
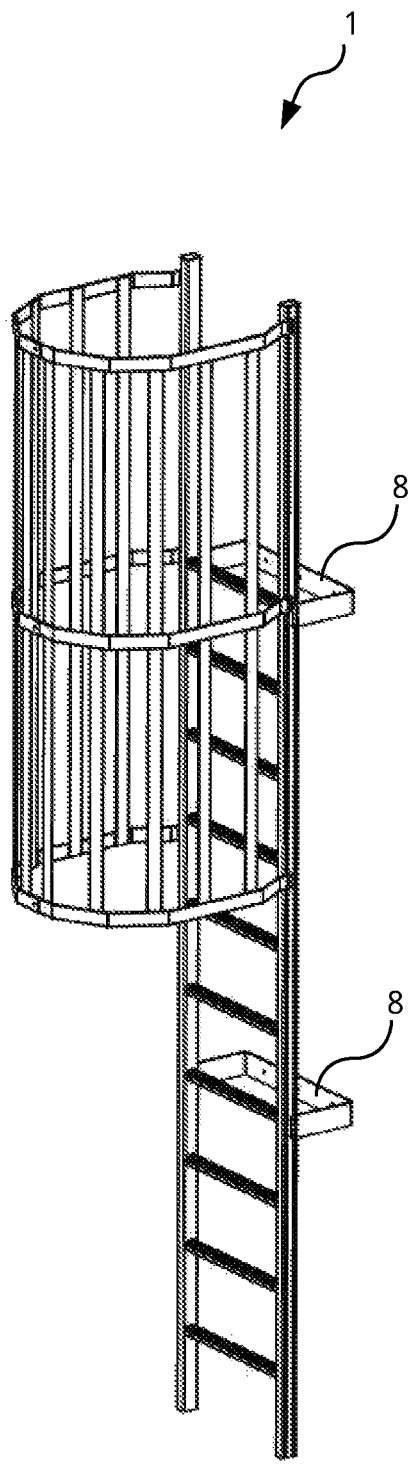
FIG. 35 shows a perspective view and side elevation of the modular ladder system fastened vertically to a wall.
Figure 35B:
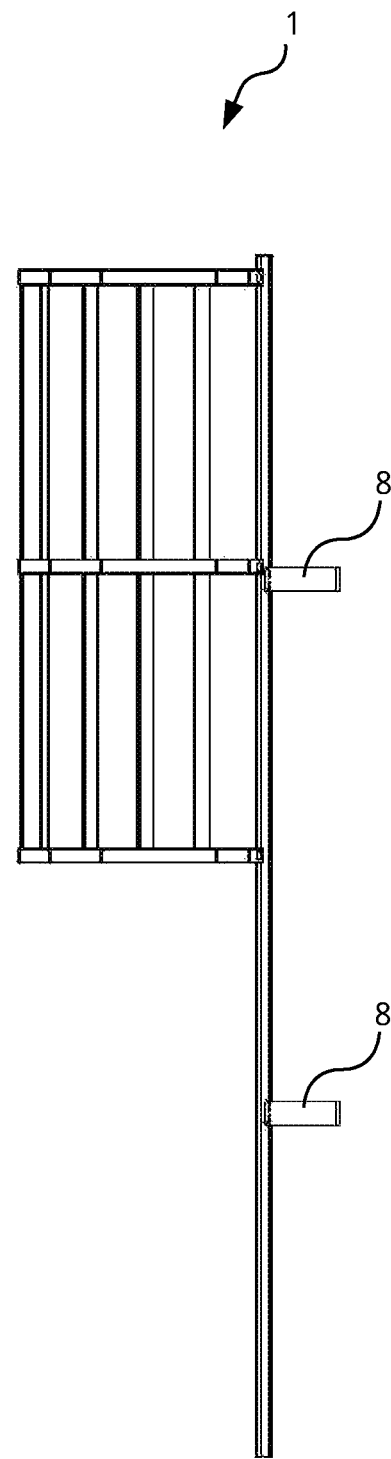

FIG. 30 shows an adjustable fixing bracket 28 which may be utilised for supporting the rung sections 2 at an angle. Specifically, whereas orthogonal upper and lower wall brackets 8 may be utilised for supporting the modular ladder system 1 vertically as shown in FIGS. 35A and 35B; the upper and lower adjustable fixing brackets 28 may be utilised for supporting the modular ladder system 1 at an angle as shown in FIGS. 34A and 34B.

The adjustable fixing bracket 28 may comprise dual adjusting plates 29, having a fore aperture 30 for fastening to an aft longitudinal attachment channel 6 of the stile extrusion 3, utilising a single attachment fastener 12 so as to be pivotable.

As can be appreciated from the embodiment shown in FIGS. 34A and 34B, when the modular ladder system 1 is angled, the lower adjustable fixing bracket 28 requires greater reach, and therefore, returning to FIG. 30, the adjustable fixing bracket 28 further comprises a profile channel extrusion 31, within which the dual adjusting plates 29 are able to slide for length adjustability. The profile channel extrusion 31 comprises a lip-edged cross-section to accommodate the dual adjusting plates 29.

In embodiments, the profile channel extrusion 31 further comprises a single attachment channel, allowing for the attachment fastener 12 to extend through an aft aperture 32 of the adjusting plate 29 to be engaged thereby.

Figure 31:
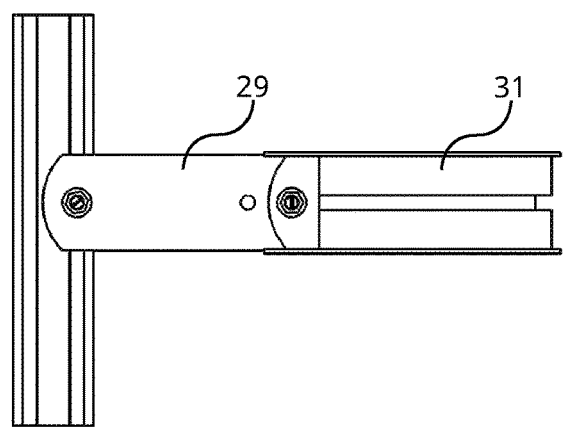
Figure 32:
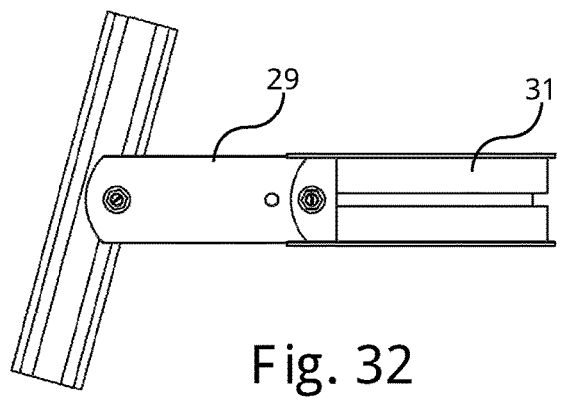
Figure 33:
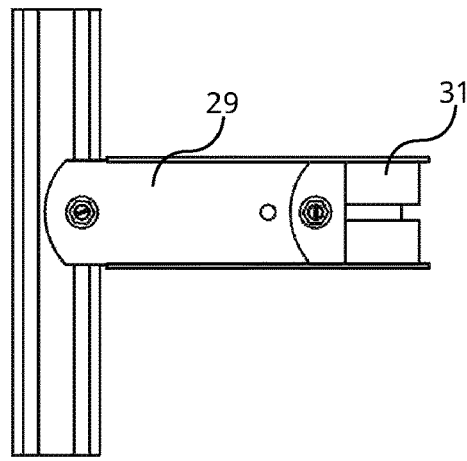

FIG. 31 shows the adjusting plate 29 extended fully from the profile channel extrusion 31, whereas FIG. 33 shows the adjusting plate 29 retracted fully with respect to the profile channel extrusion 31. FIG. 32 shows the adjusting plate 29 rotationally offset at an angle with respect to the stile extrusion 3.

Figure 44:
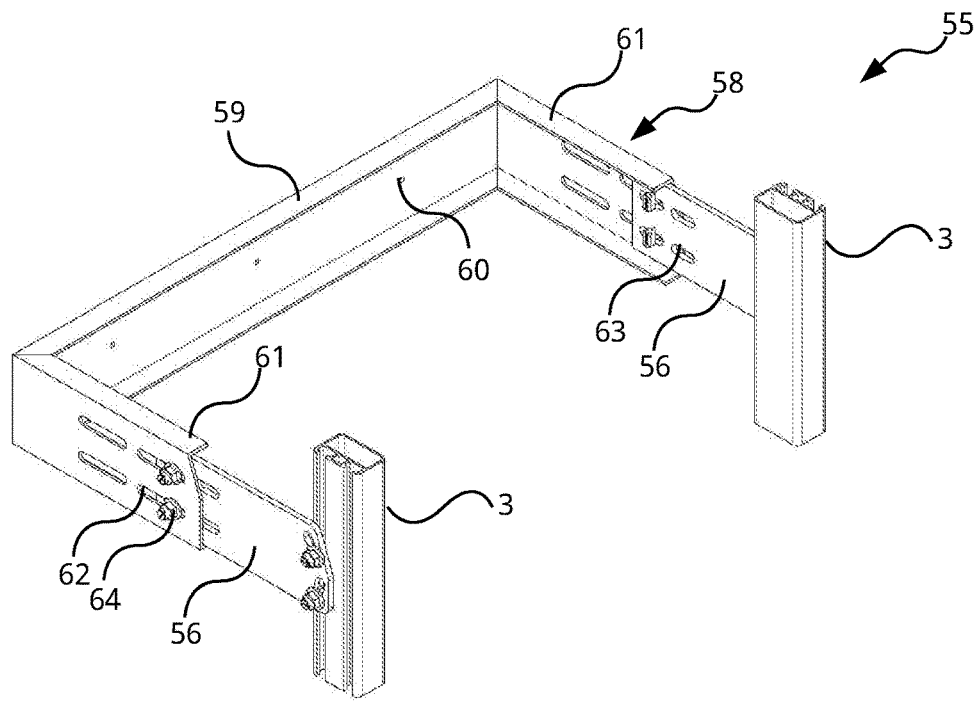
FIGS. 44-46 show an adjustable attachment bracket in accordance with a further embodiment.
Figure 45:
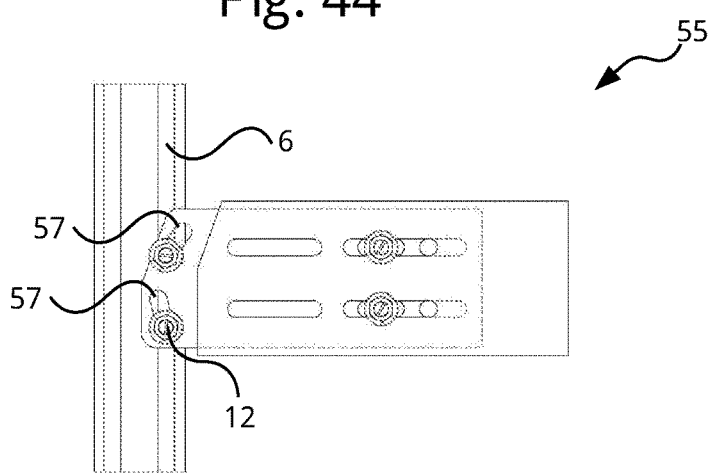
Figure 46:
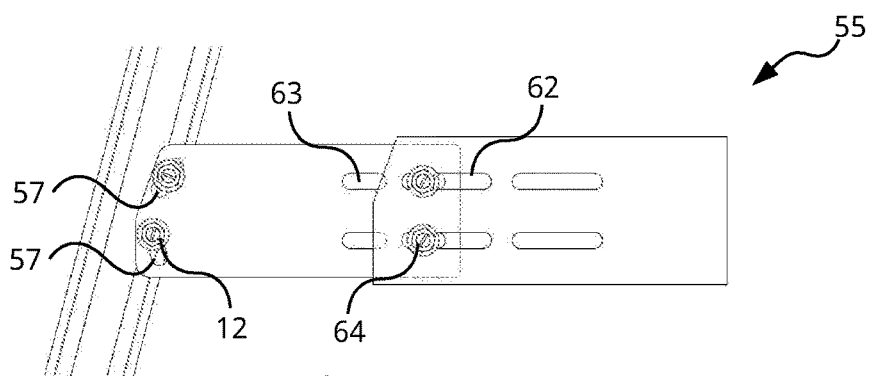

FIGS. 44-46 show an adjustable fixing bracket 55 in accordance with a further embodiment. In accordance with this embodiment, the bracket 55 comprises fixing plates 56 having radially orientated elongate fixing apertures 57. The fixing apertures 57 are described as being radially orientated because they align tangentially with the circumference of an imaginary circle, thereby allowing the bracket 55 to angle with respect to the stile extrusions 3.

The fixing apertures 57 may accommodate a pair of attachment fasteners 12 therethrough to the corresponding rearward attachment channel 6 of the stile extrusion 3.

The apertures 57 may be arranged such that the fasteners 12 locate at the lowest extent of the apertures 57 when the bracket 55 is substantially orthogonal with respect to the stile extrusions 3 as shown in FIG. 45.

However, the apertures 57 may allow inclination of the bracket 55 with respect to the stile extrusion 3 as is shown in FIG. 46. As can be seen, as the bracket 55 angles with respect to the stile extrusions 3, the fasteners 12 travel upwardly within the respective apertures 57 so as to allow for angle adjustability. At the appropriate angle, the fasteners 12 may be tightened to set the bracket 55 at an appropriate angle.

The bracket 55 may further comprise a fixed channel extrusion 58 comprising a central portion 59 having apertures 60 therein for fixing to a structure such as a wall. The fixed channel extrusion 58 may comprise orthogonal sides 61 defining respectively inward facing channels therealong within which the fixing plates 56 are able to slide. Furthermore, the orthogonal sides 61 may comprise elongate fixation slots 62 which correspond with corresponding elongate fixation slots 63 of the fixing plates 56 which collocate for the insertion of fasteners 64 therethrough to lock the plates 56 in place with respect to the orthogonal sides 61. The attachment fasteners 12 and 64 may comprise T-bolts and serrated flanged hexagonal locknuts. FIG. 46 illustrates the shortening of the bracket 55 and FIG. 46 illustrates the lengthening of the bracket 55 using this arrangement.

Figure 47:
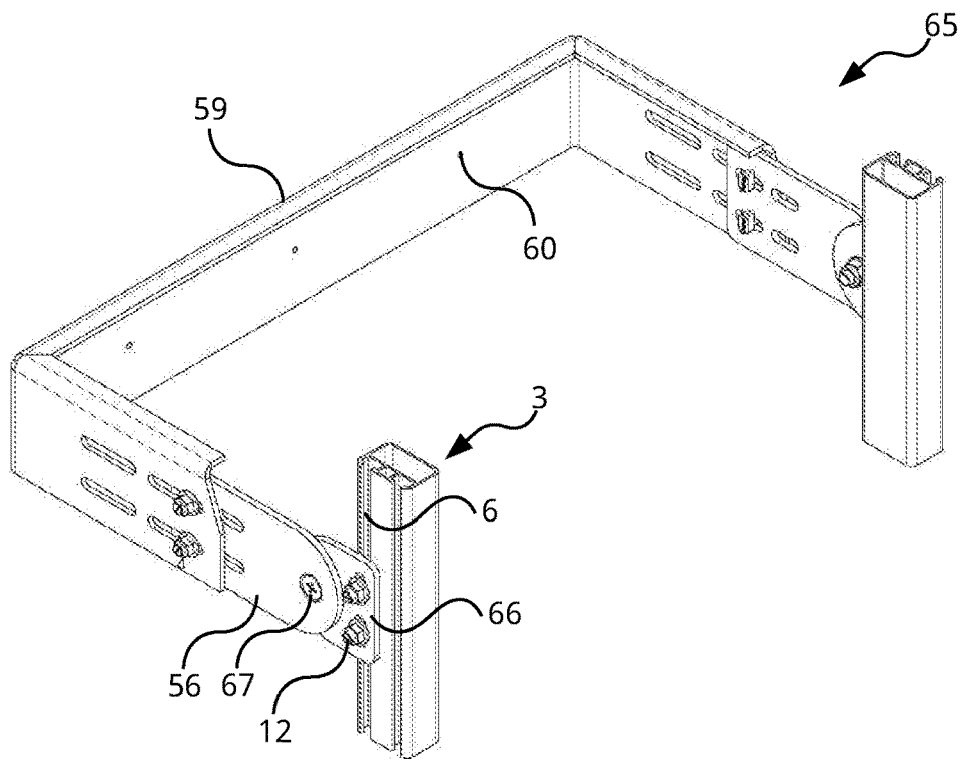
FIG. 47 shows an adjustable attachment bracket in accordance with a yet further embodiment.

FIG. 47 shows a further embodiment of an adjustable fixing bracket 65 wherein, as opposed to comprising the aforedescribed radially orientated apertures 57, the adjustable fixing bracket 65 comprises a fixed pivot plate 66 which may be secured by attachment fasteners 12 to an aft attachment channel 6 of the stile extrusion 3. An attachment fastener 67 interfaces the fixed pivot plate 66 and the rearward fixing plate 56 such that the fixing plate 56 is able to pivot with respect to the fixed pivot plate 66 and thereby adjust the angle of the bracket 65 with respect to the stile extrusions 3.

Figure 48:
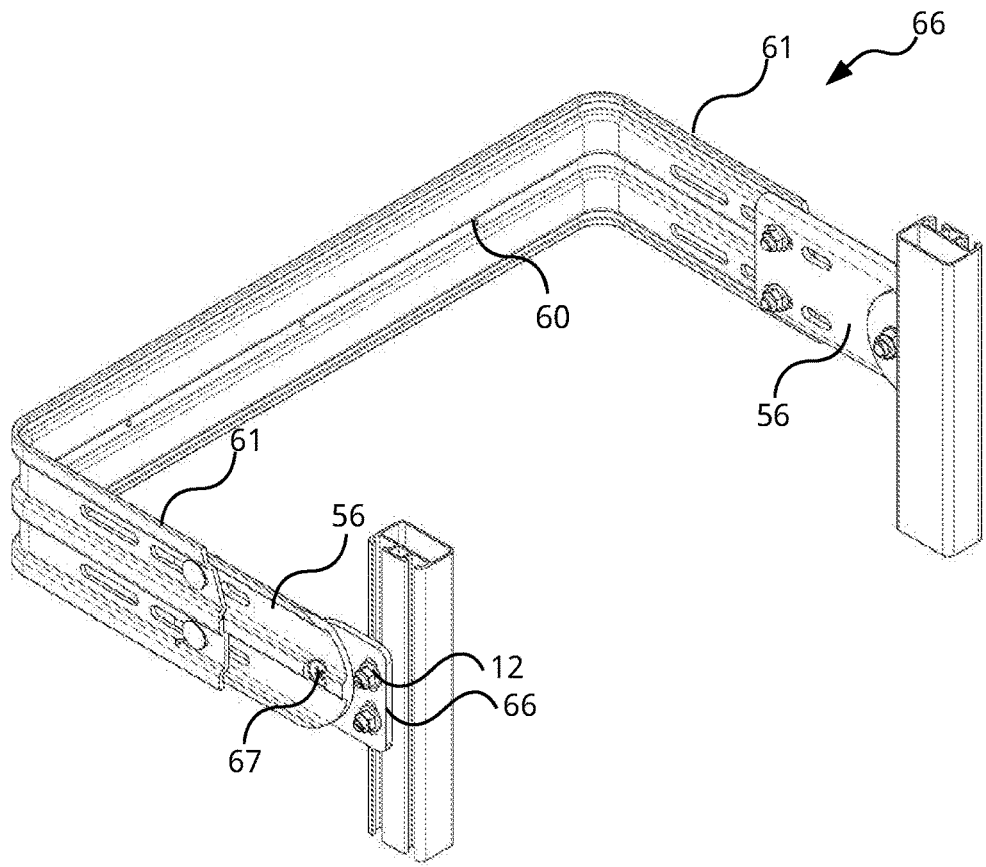
FIG. 48 shows an adjustable attachment bracket in accordance with a yet further embodiment.

FIG. 48 shows a further embodiment of an adjustable fixing bracket 66 substantially similar to the embodiment of FIG. 47 except that the fixing plates 56 and the orthogonal sides 61 have a complimentary interlocking extrusion profile. Furthermore, the fasteners 67 may comprise cup head bolts with nylon locknuts.

FIGS. 36-39 show a vertical fall arrest traveller device 33 and traveller track extrusion 34, which may be utilised for arresting user falls from the modular ladder system 1.

Figure 36:
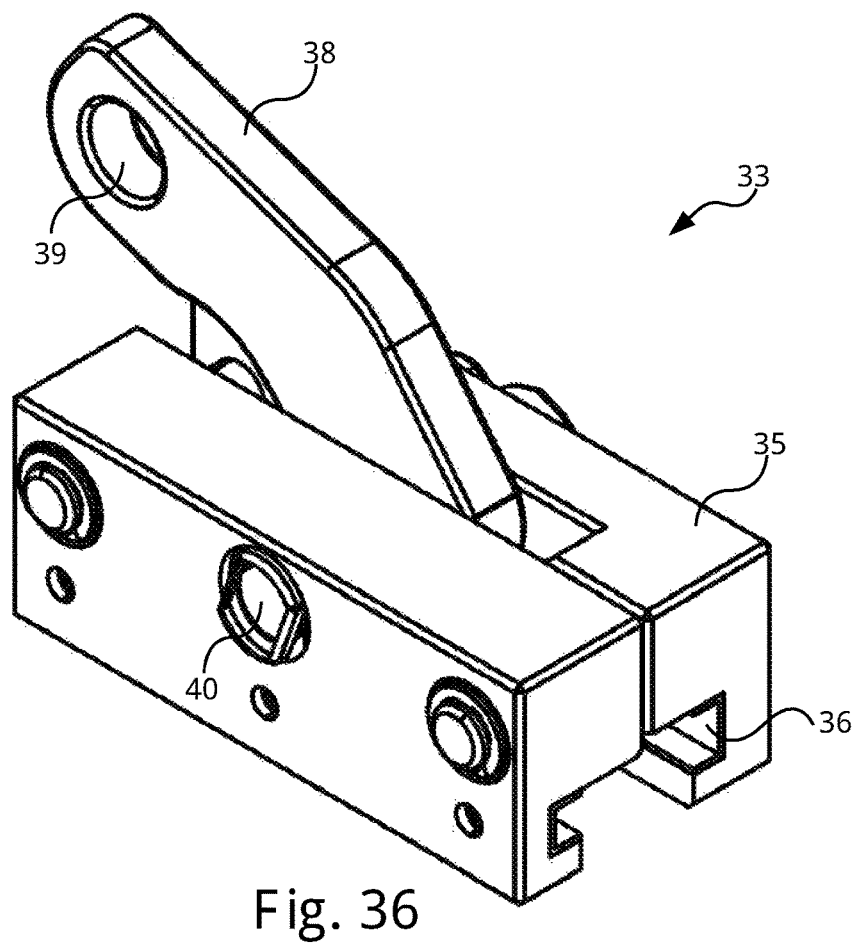
FIGS. 36-39 show a vertical fall arrest mechanism, comprising a traveller device and track, in accordance with an embodiment.
Figure 37:
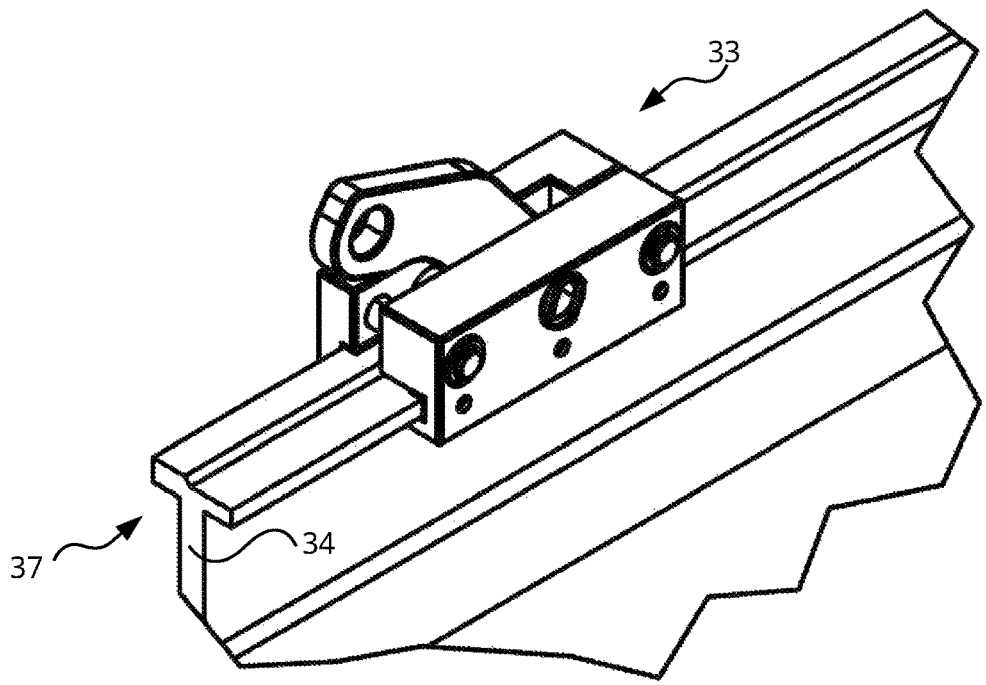
Figure 39:
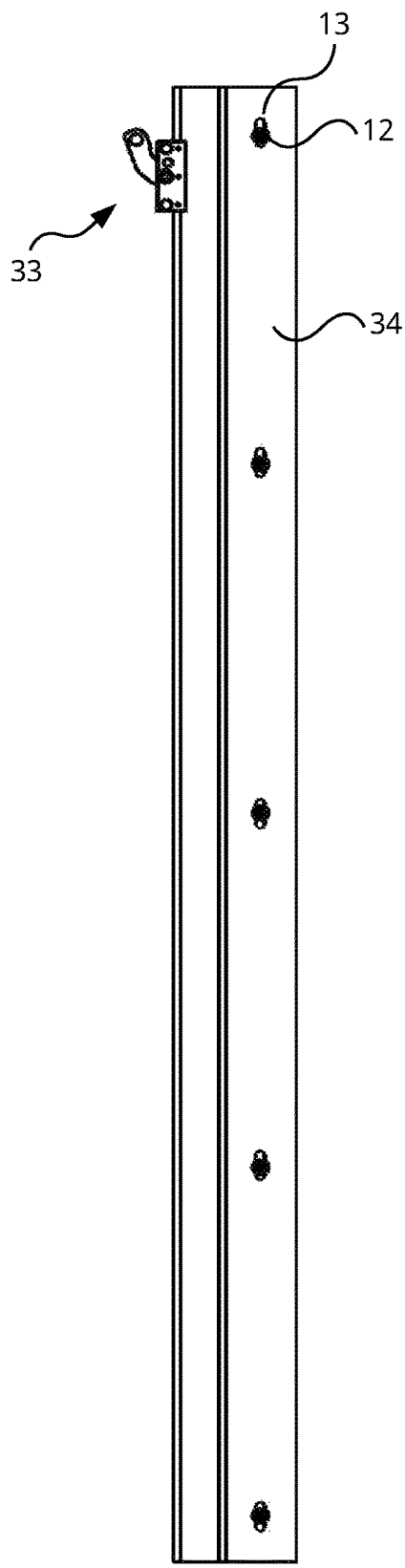

Specifically, FIG. 39 shows the traveller track extrusion 34 fastened vertically along a fore longitudinal attachment channel 6 of the stile extrusion 3, by means of a plurality of attachment fasteners 12 and hexagonal locknuts 13. As can be seen in FIG. 36, the fall arrest traveller device 33 may comprise a split body 35 defining a profiled/keyed channel 36 thereunderneath, which engages about an integral T-shaped keyed guide head 37 of the traveller track extrusion 34. Furthermore, the fall arrest traveller device 33 comprises an arrest lever 38 having a user attachment aperture 39 for a carabiner or the like at the distal end thereof, and which pivots around a fulcrum pin 40 so as to selectively jam against the T-shaped guide head 37 when levered by an applied downward force, therefore inhibiting travel of the fall arrest traveller device 33 down the traveller track extrusion 34.

Figure 38:
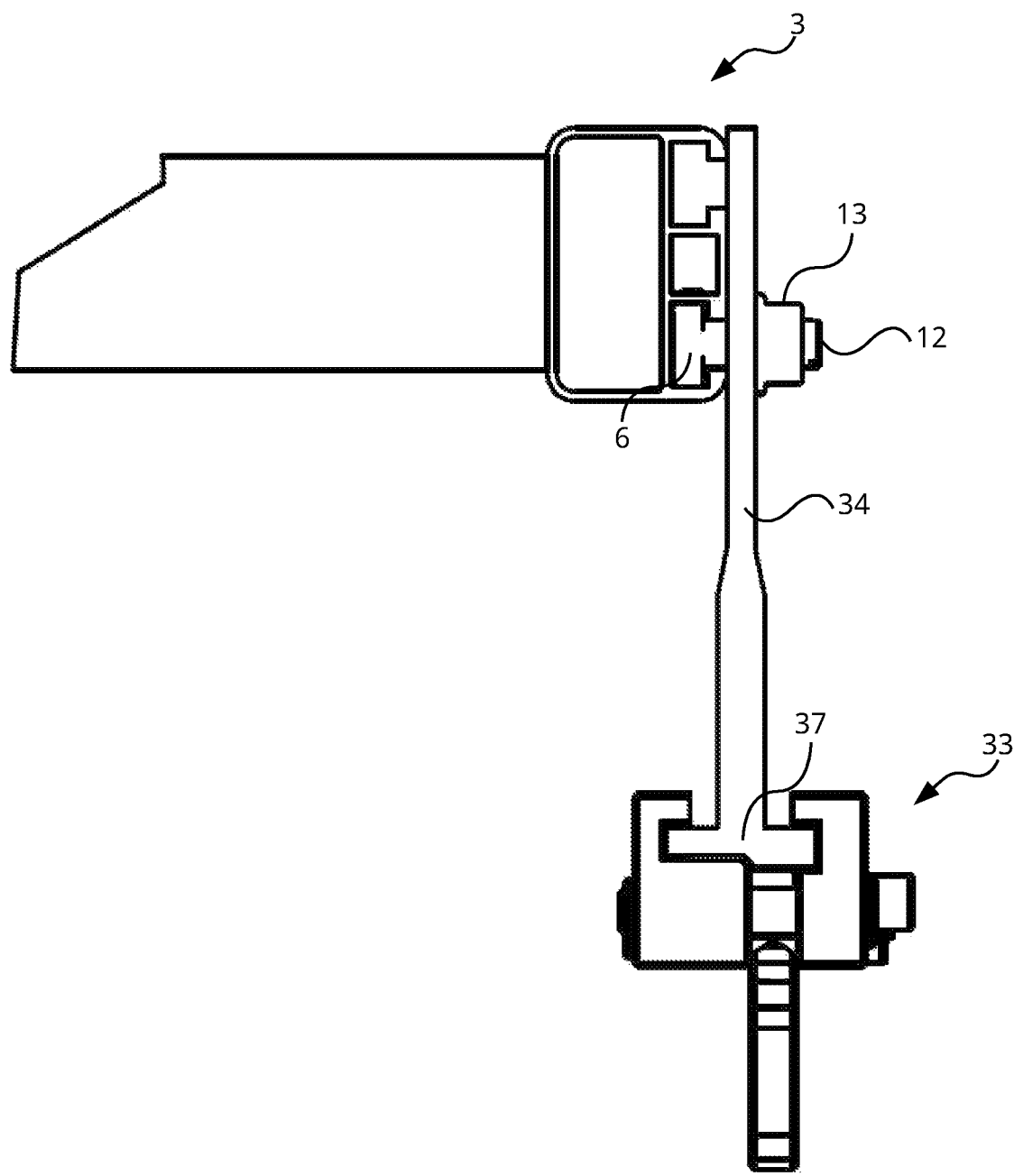

FIG. 38 shows a top plan view of the attachment of the traveller track extrusion 34 to the stile extrusion 3, utilising a plurality of attachment fasteners 12 and hexagonal locknuts 13 within the fore longitudinal attachment channel 6. The profile of the traveller track extrusion 34 is illustrated wherein, in the embodiment shown, it can be seen that the profile widens towards the fall arrest traveller device 33 and terminates in the T-shaped guide head 37 about which the traveller device 33 engages.

Figure 49:
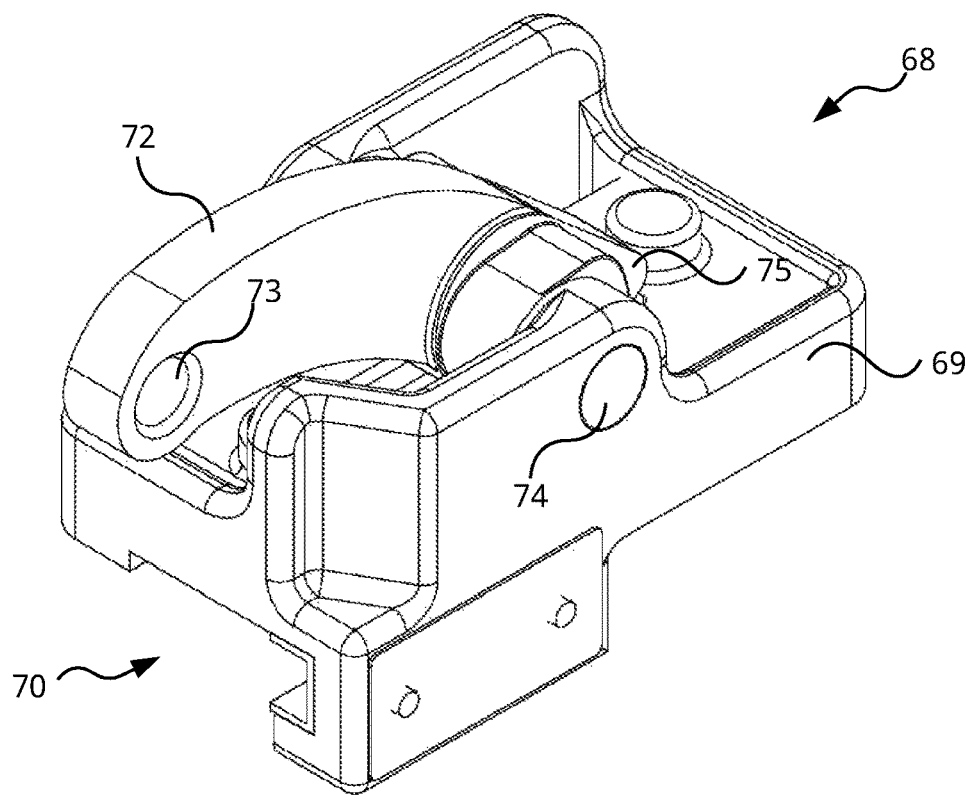
FIG. 49 shows a vertical fall arrest device in accordance with a further embodiment.
Figure 50:
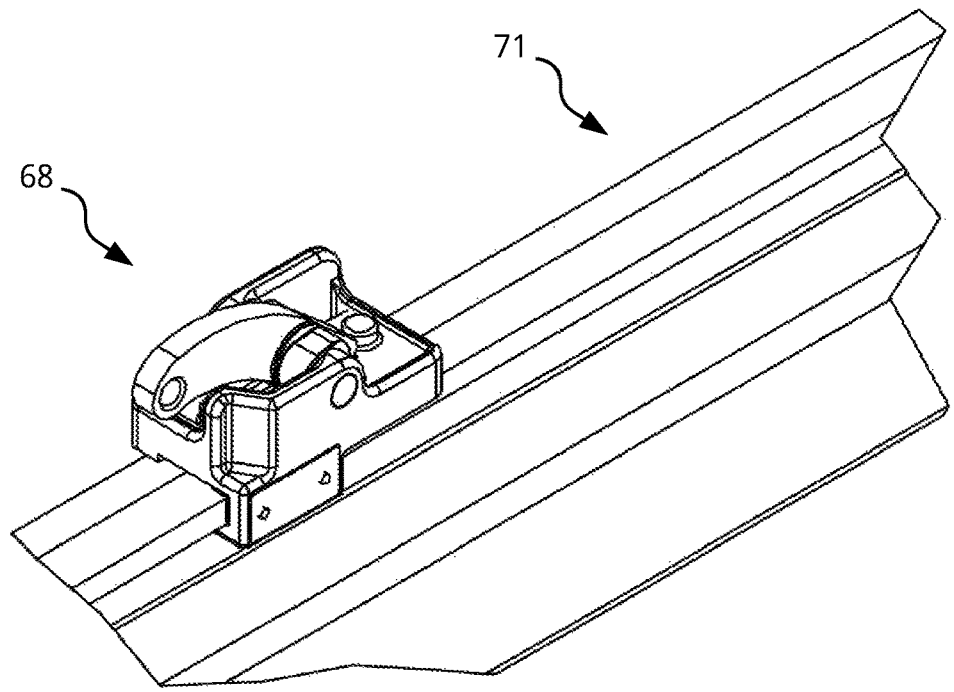
FIG. 50 shows the vertical fall arrest device of FIG. 49 sliding along a traveller track extrusion.

FIGS. 49 and 50 show a further embodiment of a vertical fall arrest traveller device 68 which comprises a body 69 defining a profiled carriage channel 70 thereunderneath within which a traveller track extrusion 71 slides. The device 68 further comprises an arrest lever 72 comprising a proximal end having an attachment aperture 73 for a carabiner, lanyard or the like, which levers about a fulcrum pin 74 such that a distal end 75 thereof protrudes through into the carriage channel 70 thereby causing the distal end 75 of the arrest lever 72 to interfere with the upper surface of the track extrusion 71, thereby inhibiting travel of the device 68 down the track extrusion 71.

Figure 51:
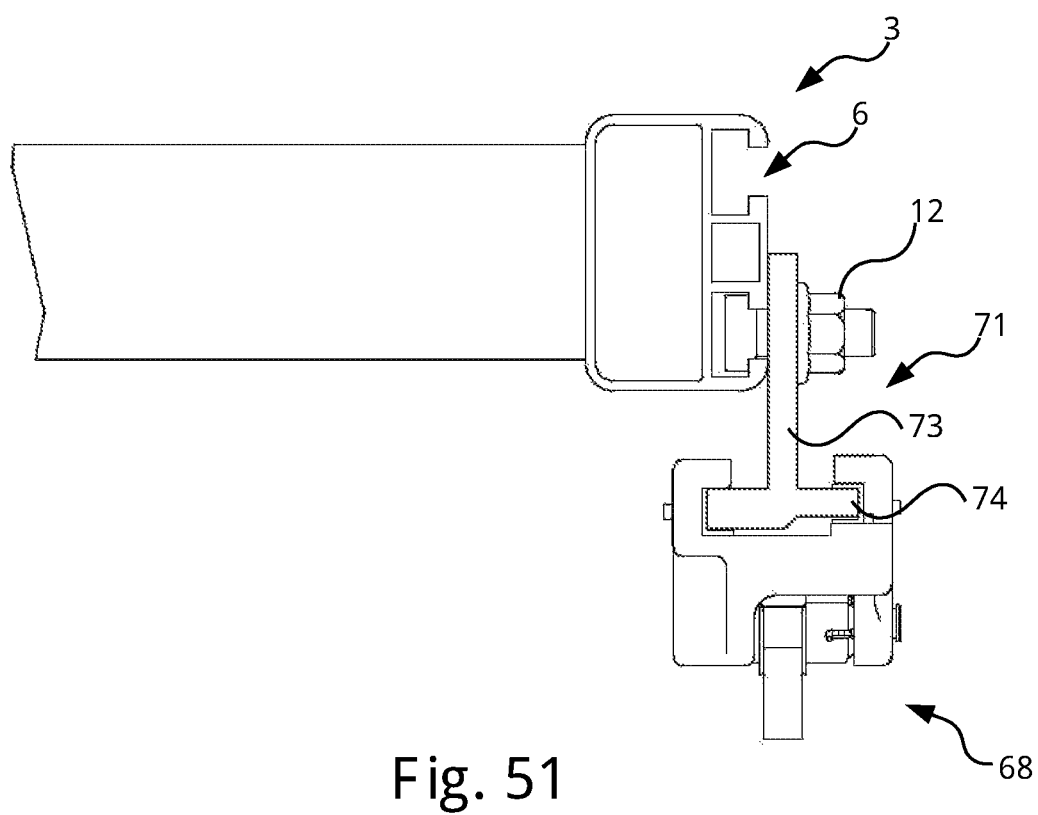
FIG. 51 shows a top plan view illustrating the manner of engagement of the vertical fall arrest device of FIG. 49 to the traveller track extrusion in accordance with an embodiment.

FIG. 51 shows the attachment of the track extrusion 71 using an attachment fastener 12 to a fore attachment channel 6 of the stile extrusion 3. In this regard, the track comprises an elongate stem 73 and a transverse head 74. Opposite sides of the transverse head 74 may have differing thicknesses and the carriage channel 70 may have a corresponding profile so as to orientationally key the vertical fall arrest device 68 such that the device cannot be incorrectly attached to the track 71 in an upside down orientation.

Figure 52:
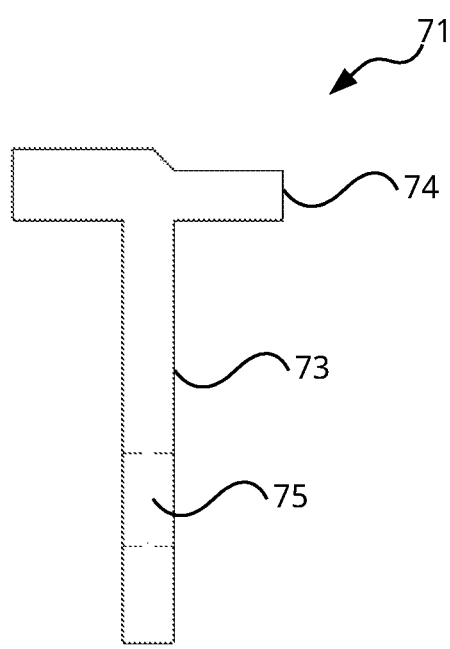
FIG. 52 shows a cross-section of the traveller track extrusion of FIG. 50 in accordance with an embodiment.

FIG. 52 shows the profile of the track extrusion 71 in further detail which may have an aperture 75 therein for the attachment fastener 12.

Figure 53:
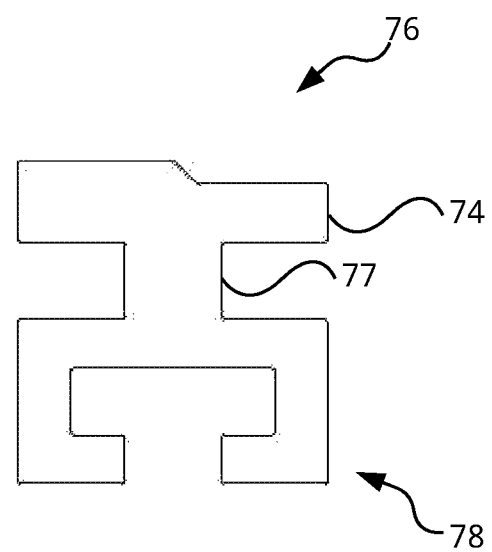
FIG. 53 shows a traveller adapter track extrusion in accordance with an embodiment.

FIG. 53 shows an adapter traveller track extrusion 76 comprising the transverse head 74 and a shorter stem 77 and an engagement profile 78 for engaging about a T-shaped rail (not shown).

Figures 54, 55, 56:
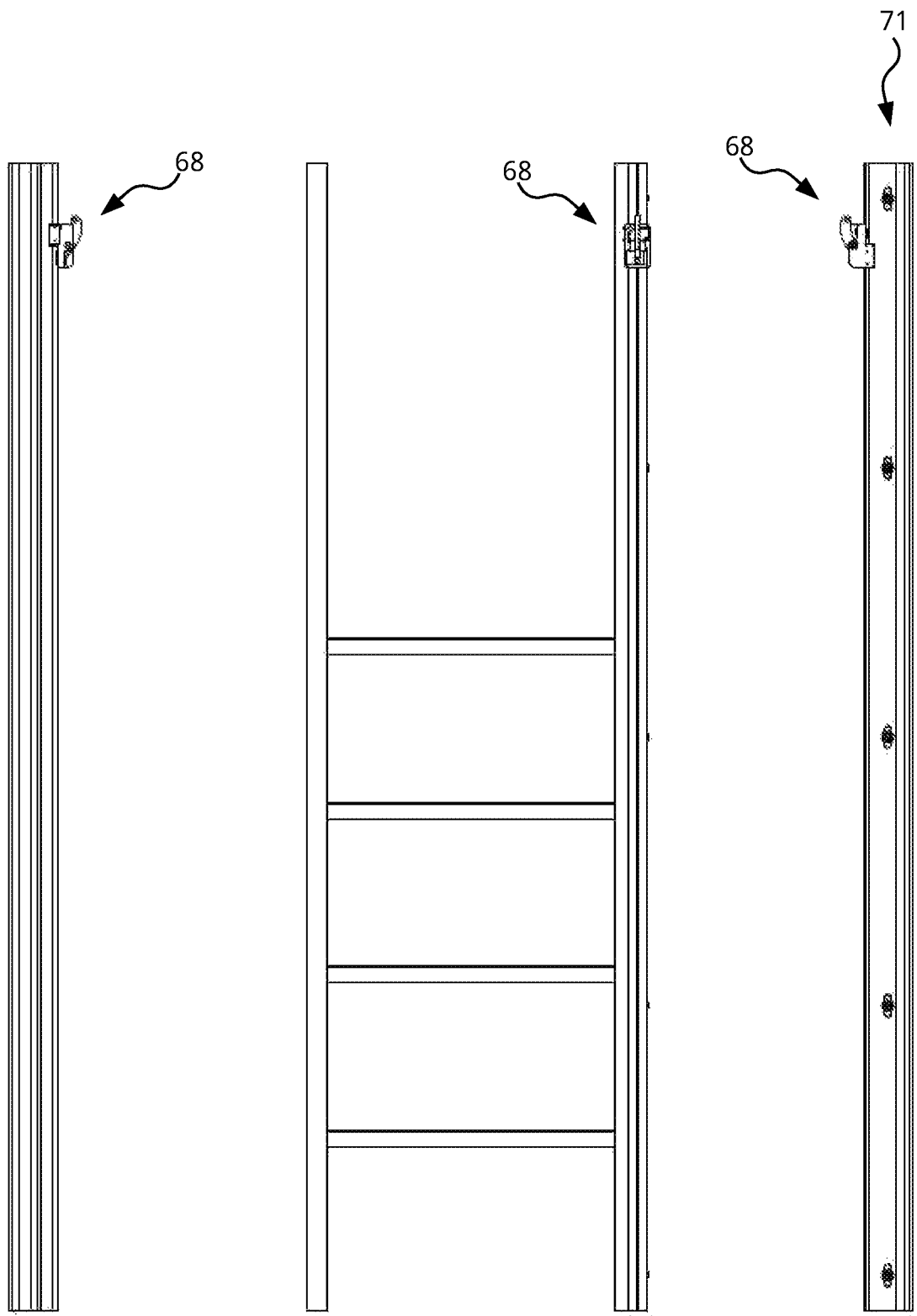
FIGS. 54-56 illustrate the attachment of the traveller track extrusion having the vertical fall arrest device attached thereto to a ladder in accordance with an embodiment.
Figure 57:
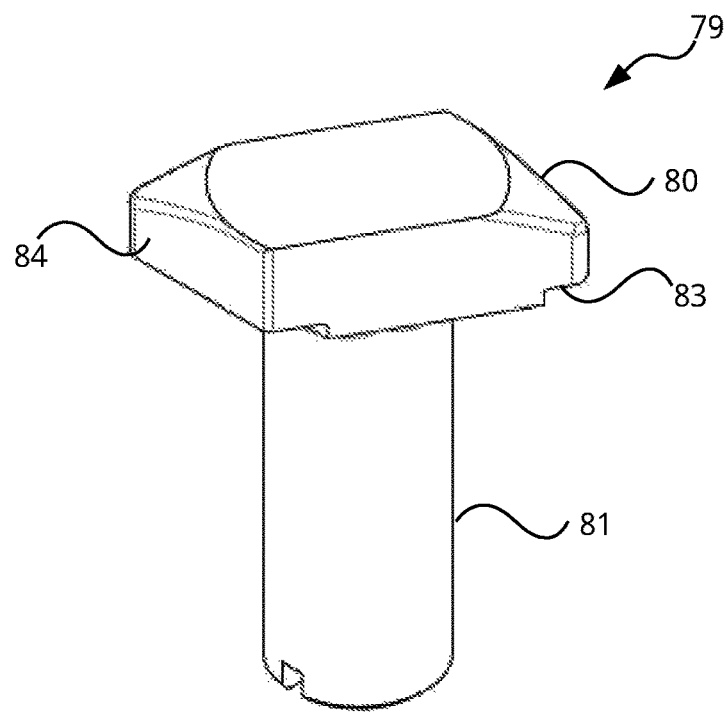
FIGS. 57-60 show further details and exemplary dimensions of the attachment fastener in accordance with a further embodiment
Figure 58:
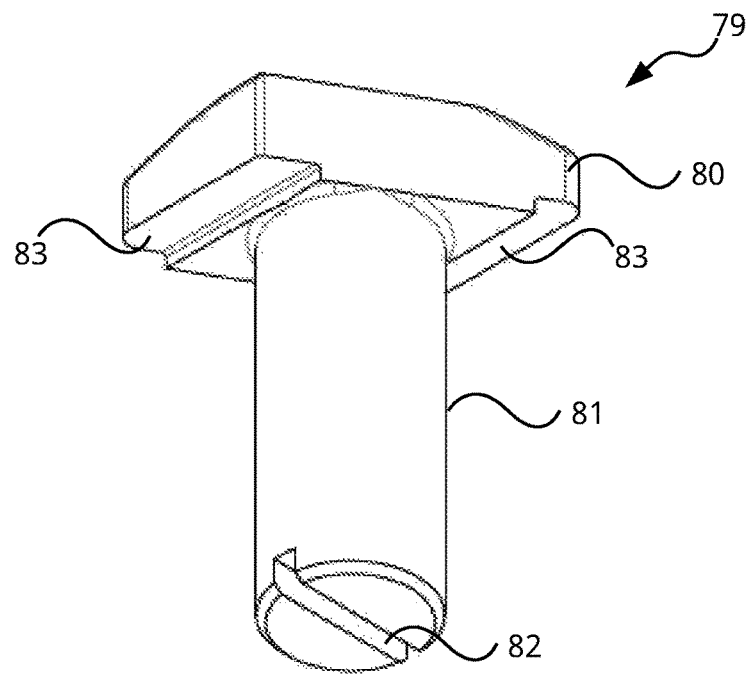
Figure 59:
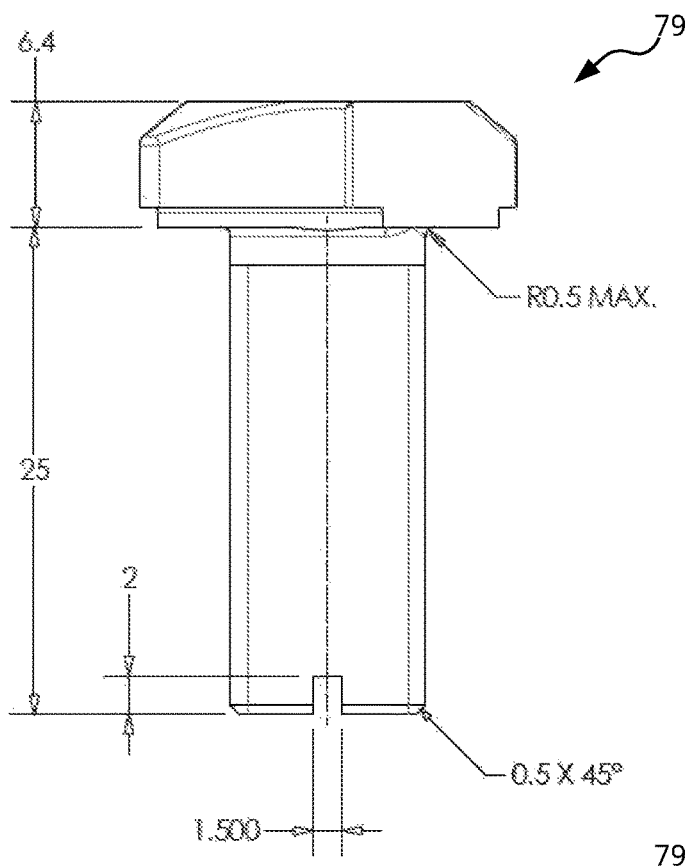

FIGS. 54, 55 and 56 show respective left side, front and right side elevation views illustrating the operation and orientation of the vertical fall arrest device 68 on the traveller track extrusion 71, when installed on the stile extrusion of the modular rung ladder 1.

FIG. 40 shows various views of the attachment fastener 12, utilised in the embodiments shown above during installation of the modular ladder system 1. The attachment fastener 12 may be used for attachment of the fore and aft accessories and comprises a threaded stem 54 of which the proximal end thereof may have a rotational indicative slot 41 to ensure proper orientation for adequate securement. The opposite end may comprise the elongate head 14 having planar faces 15 which rotates out of alignment and is tightened utilising a flanged serrated hexagonal locknut 13.

Figure 40A:
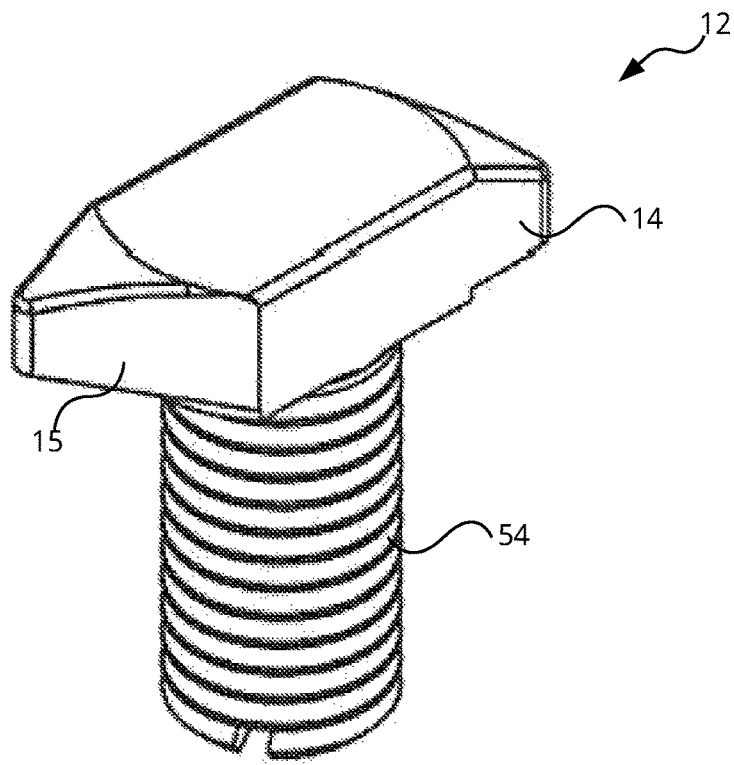
FIG. 40 shows an attachment fastener, in accordance with an embodiment.
Figure 40B:
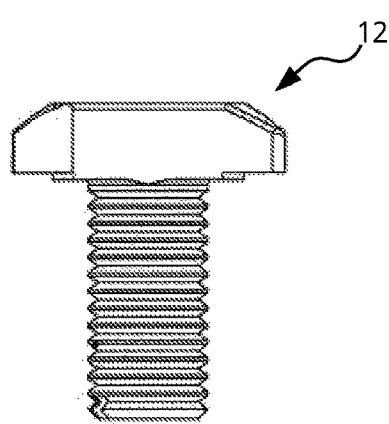
Figure 40C:
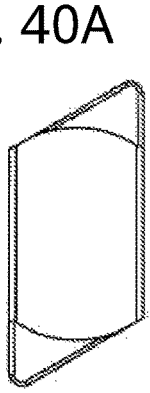
Figure 40D:
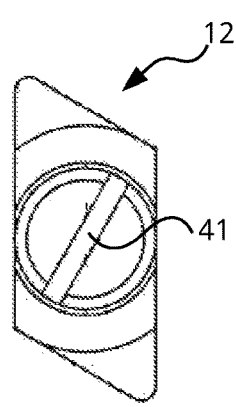
Figure 40E:
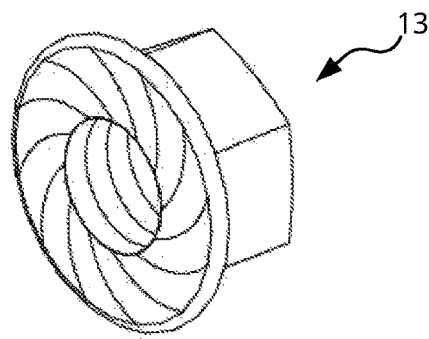

FIG. 40A shows a perspective view of the attachment fastener 12 and FIGS. 40B-D show side elevation, top plan, and bottom plan views respectively. FIG. 40E shows the corresponding flanged serrated hexagonal locknut 13.

Figure 41A:
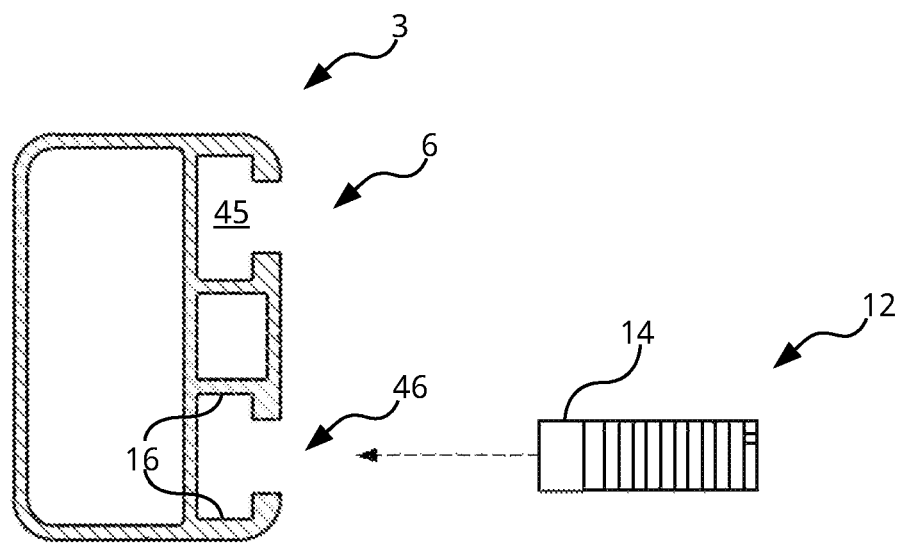
FIGS. 41-42 show the engagement of the attachment fastener of FIG. 40 within the stile extrusion attachment channel in accordance with an embodiment.
Figure 41B:
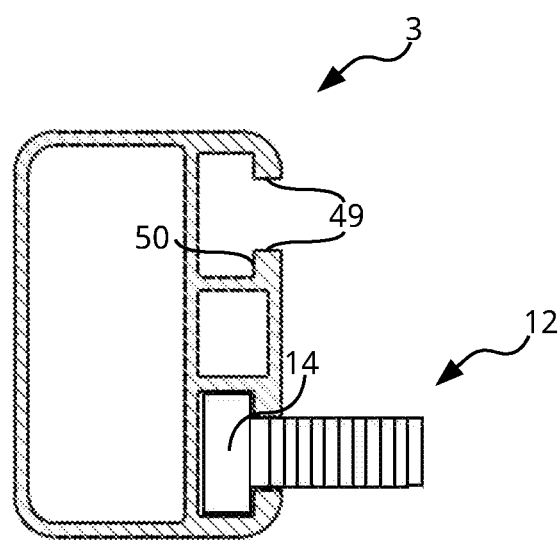
Figure 42:
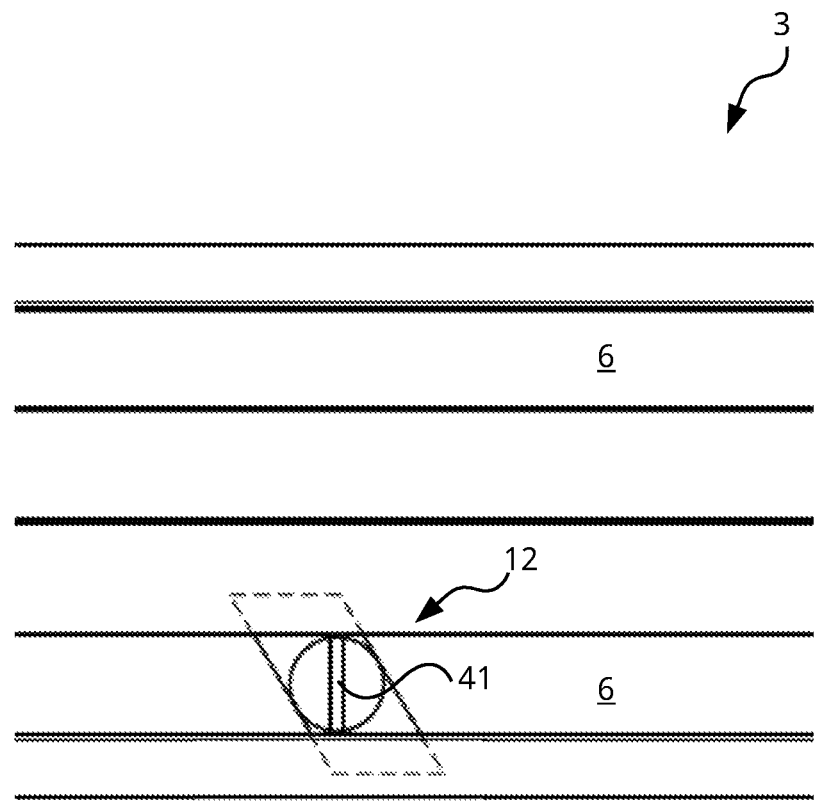

FIGS. 41 and 42 illustrate the engagement of the attachment fastener 12 within the stile extrusion attachment channel 6 wherein, as can be seen from FIGS. 41A and 41B, the elongate head 14 is initially inserted in-line through the insertion space 46 into the connector head accommodation void 45, whereafter, under the torque exerted by the hexagonal locknut 13, the elongate head 14 rotates so that the angled faces 15 thereof jam flush against the opposing inner walls 16 of the attachment channel 6 and lock against the under edges 50 of the associated inwardly projecting rails 49.

FIGS. 57-60 show an attachment fastener 79 in accordance with a further embodiment. The fastener 79 comprises the head 80 and the threaded stem 81 extending orthogonally therefrom. A distal end of the threaded stem 81 may comprise the orientational indicator slot 82.

Figure 60:
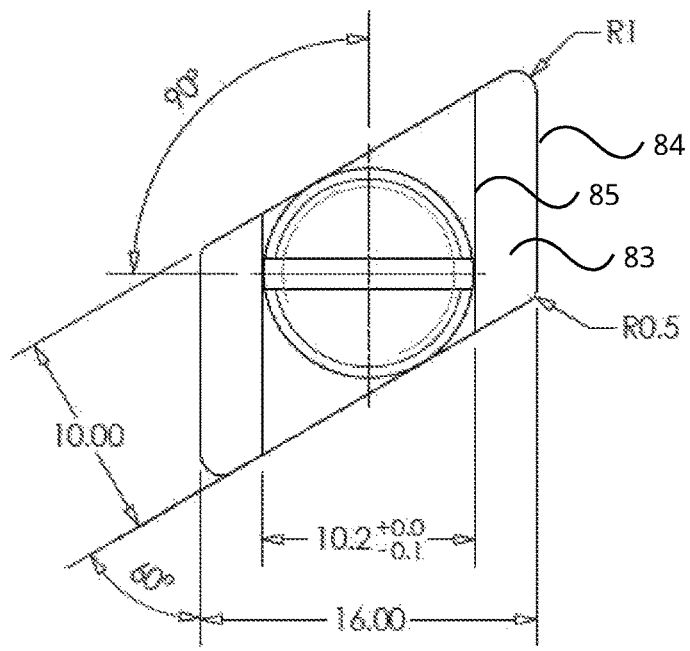

However, the fastener 79 comprises lateral recesses 83 under the head 80 which, with reference to FIG. 60 form an angled recess edge 85 parallel with an adjacent angled face 84 of the head 80.

Each angled recess edge 85 may abut along a corresponding inner edge of a respective rail 49 when the fastener 79 is tightened with a locknut. In this way, the lateral recesses 83 facilitate location of the fasteners 79 during assembly as well as locking of the fastener 79 when tightened.

The foregoing description, for purposes of explanation, has used specific nomenclature to provide a thorough understanding of the invention. However, it will be apparent to one skilled in the art that specific details are not required in order to practise the invention. Thus, the foregoing descriptions of specific embodiments of the invention are presented for purposes of illustration and description. They are not intended to be exhaustive, nor to limit the invention to the precise forms disclosed, as many modifications and variations are obviously possible in the light of the above disclosures. The embodiments were chosen and described in order to best explain the principles of the invention and its practical applications and configurations, thereby enabling others skilled in the art to best utilise the invention and various embodiments, with various modifications and variations as may be suited to the particular uses contemplated. It is intended that the following claims and their equivalents define the scope of the invention.

The invention claimed is:

1. A modular ladder system comprising:
   a rung section comprising two elongate lateral stile extrusions and elongate rung extrusions spanning orthogonally therebetween, wherein each lateral stile extrusion defines:
      an attachment side having an attachment face having first and second attachment channels being adjacent, parallel and longitudinally arranged along the attachment face, each channel having side walls and spaced apart inward facing rails facing each other at ends of the side walls, the spaced apart inward facing rails defining an elongate insertion space therebetween and a relatively wider connector head accommodation void thereunderneath, between the side walls, each rail defining a connector head engaging under edge thereunderneath; and
      a connection side adjacent to the attachment side, the connection side defining a splice joint extrusion accommodating void therein, wherein the attachment side and the connection side meet at a shared inner wall
   an accessory comprising first accessory planar sides which are spaced to lie flush against respective opposite attachment sides of the rung section, each of the first accessory planar sides comprising a pair of spaced elongate attachment apertures which collocate over the first attachment channel when the first accessory planar sides lie flush against the respective attachment sides;

attachment fasteners configured to insert through respective attachment apertures of each side into the respective attachment channel, collocating with the respective attachment apertures thereunder for connecting the accessory to the respective attachment channels, each attachment fastener comprising an elongate fastener head having a width less than that of the insertion space and a length greater than a width of the insertion space and wherein the fastener head is rotated out of alignment within a respective connector head accommodation void such that opposite under surfaces thereof engage against respective under edges of the respective connection channel; and a further accessory, the further accessory comprising further accessory planar sides which are spaced to lie flush against respective opposite attachment sides of the rung section, each of the further accessory planar sides comprising at least one aperture positioned over the second attachment channel, wherein the first and second attachment channels are sufficiently spaced apart wherein when the first and further accessories are disposed at opposite sides of the ladder at the same elevation, the first accessory planar side and the further accessory planar side do not contact each other; and each attachment aperture has a length greater than the length of the elongate fastener head and wherein each attachment aperture defines a longitudinal axis and wherein longitudinal axes of the attachment apertures of each side are aligned and aligned with a longitudinal axis of the respective attachment channel.

2. The modular ladder system as claimed in claim 1, wherein attachment faces of the two elongate lateral stile extrusions face either oppositely or outwardly.

3. The modular ladder system as claimed in claim 1, wherein the rung extrusions span between connection sides of the stile extrusions.

4. The modular ladder system as claimed in claim 1, wherein the splice joint extrusion accommodating void has a width substantially equal to a widthwise extent, defined as a distance between exterior sides of the two longitudinal attachment channels.

5. The modular ladder system as claimed in claim 1, further comprising a further rung section and a pair of elongate splice joint extrusions located partially within respective adjacent splice joint extrusion accommodation voids of the further rung section with a portion extending therefrom such that, when the further rung section is interconnected with the rung section by inserting the portion into respective adjacent splice joint extrusion accommodation voids of the rung section, the rung section is disposed directly adjacent to the further rung section.

6. The modular ladder system as claimed in claim 1, further comprising an elongate splice joint extrusion and wherein the splice joint extrusion accommodation voids and the elongate splice joint extrusion are substantially correspondingly rectangular.

7. The modular ladder system as claimed in claim 6, wherein the splice joint extrusion comprises either (1) exterior frictional engagement nibs configured for frictionally engaging against an interior surface of the splice joint extrusion accommodation void in use, or (2) a splice joint locking insert for frictionally interfacing between an outer surface of the splice joint extrusion and corresponding respective inner surfaces of splice joint extrusion accommodating voids of opposingly coupled lateral stile extrusions.

8. The modular ladder system as claimed in claim 7, wherein the splice joint locking insert comprises oppositely orientated co-planar tapered wing sections.

9. The modular ladder system as claimed in claim 8, further comprising a central splice joint spacer located between the tapered wing sections.

10. The modular ladder system as claimed in claim 9, wherein the central splice joint spacer defines a splice joint extrusion accommodation.

11. The modular ladder system as claimed in claim 10, wherein cut-outs in the central splice joint spacer define lateral stile extrusion accommodations for the longitudinal attachment channels.

12. The modular ladder system as claimed in claim 8, wherein a distal end of each tapered wing section comprises an integral nib configured for locating within a corresponding aperture of the splice joint extrusion.

13. The modular ladder system as claimed in claim 1, wherein the elongate fastener head comprises angled ends which jam flush against opposite inner walls of the connector head accommodation void when rotated out of alignment.

14. The modular ladder system as claimed in claim 1, wherein the attachment fastener comprises a proximal threaded stem which extends from a respective attachment aperture in use and further comprising a locknut engageable thereto and wherein tightening of the locknut causes the fastener head to rotate out of alignment with the attachment channel.

15. The modular ladder system as claimed in claim 14, wherein a proximal face of the threaded stem comprises a rotational indicator.

16. The modular ladder system as claimed in claim 1, wherein the accessory is a wall bracket comprising a transverse member and orthogonal end members, distal ends of each orthogonal end member comprising the attachment apertures and wherein the wall bracket is sized such that the attachment apertures substantially collocate with the corresponding pair of attachment channels.

17. The modular ladder system as claimed in claim 1, wherein the accessory is a ladder safety cage comprising upper and lower horizontal hoops, the proximal ends of each thereof comprising the attachment apertures and wherein the ladder safety cage is sized such that the attachment apertures substantially collocate with the corresponding pair of attachment channels.

18. The modular ladder system as claimed in claim 1, further comprising an adjustable fixing bracket having an adjusting plate comprising an aperture for fastening to the attachment channels of the lateral stile extrusion in a pivotable manner.

19. The modular ladder system as claimed in claim 18, wherein the adjustable fixing bracket is length adjustable and further comprises profile channel extrusions, within which respective adjusting plates locate and are able to slide.

20. The modular ladder system as claimed in claim 19, wherein each profile channel extrusion of the adjustable fixing bracket further comprises a lip-edged cross-section and a central attachment channel therealong, and wherein each adjusting plate has an aft aperture through which an attachment fastener may extend for fastening the adjusting plate with respect to the profile channel extrusion.

21. The modular ladder system as claimed in claim 1, further comprising a vertical fall arrest mechanism comprising a traveller track extrusion configured for coupling to one of the attachment channels, and a fall arrest traveller device configured to travel along the traveller track extrusion, and wherein the fall arrest traveller device comprises an arrest lever comprising a fulcrum pin and user attachment point aperture, and wherein when a downward force is applied to the arrest lever, the fall arrest traveller device jams onto the traveller track extrusion.

22. The modular ladder system as claimed in claim 21, wherein the fall arrest traveller device comprises a body defining a profiled channel thereunderneath, for slidably accommodating a corresponding T-shaped guide head of the traveller track extrusion, and wherein the arrest lever pivots around the fulcrum pin such that, when a downward force is applied to the user attachment point aperture, the opposite end of the arrest lever jams against the T-shaped guide head of the traveller track extrusion.

23. The modular ladder system as claimed in claim 1, wherein each side extends orthogonally with respect to the longitudinal axes of respective attachment apertures.

\* \* \* \* \*